(12) United States Patent
Feldstein et al.

(10) Patent No.: US 8,810,578 B2
(45) Date of Patent: Aug. 19, 2014

(54) CONVERSION OF SWF SHAPE DEFINITIONS FOR VECTOR GRAPHICS RENDERING

(75) Inventors: Jonathan Mark Feldstein, Waterloo (CA); Jordan MacIntosh Saunders, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 770 days.

(21) Appl. No.: 12/565,270

(22) Filed: Sep. 23, 2009

(65) Prior Publication Data

US 2010/0271374 A1   Oct. 28, 2010

Related U.S. Application Data

(60) Provisional application No. 61/173,080, filed on Apr. 27, 2009.

(51) Int. Cl.
*G06T 11/20* (2006.01)

(52) U.S. Cl.
USPC .......................................................... 345/441

(58) Field of Classification Search
CPC .............................. G06T 11/20; G06T 11/203
USPC ............................ 345/441, 442, 443; 715/239
See application file for complete search history.

(56) References Cited

U.S. PATENT DOCUMENTS

| | | | |
|---|---|---|---|
| 5,854,634 A | 12/1998 | Kroitor | |
| 6,147,692 A | 11/2000 | Shaw et al. | |
| 6,417,855 B1 | 7/2002 | Yonts | |
| 6,556,196 B1 | 4/2003 | Blanz et al. | |
| 6,816,552 B2 | 11/2004 | Demos | |
| 7,091,995 B2 | 8/2006 | Lee et al. | |
| 7,142,211 B2 | 11/2006 | Lu | |
| 7,614,003 B2 | 11/2009 | Brichford et al. | |
| 7,911,467 B2 | 3/2011 | Airey et al. | |
| 7,999,805 B2 | 8/2011 | Whatmough | |

(Continued)

FOREIGN PATENT DOCUMENTS

| EP | 1628264 | 2/2006 |
|---|---|---|
| EP | 1475749 | 9/2008 |

OTHER PUBLICATIONS

Steve Probets, Julius Mong, David Evans, and David Brailsford, Vector Graphics: From PostScript and Flash to SVG, 2001, Proceeding DocEng '01 Proceedings of the 2001 ACM Symposium on Document engineering, pp. 135-143.*

(Continued)

*Primary Examiner* — Jeffery A Brier
(74) *Attorney, Agent, or Firm* — Rowand LLP

(57) ABSTRACT

A method and device are provided for converting or transforming a shape definition specified in a SWF file into a vector graphics shape definition. The vector graphics shape definition includes one or more vector graphics path definitions that can be used by a vector graphics API to properly render the contents of the SWF shape definition. Each vector graphics path definition is based on directed edges in the SWF shape definition having a path style, such as a line style or a fill style, in common. A vector graphics path is created by traversing undirected edges of a graph represented by a graph representation, and by removing an undirected edge, after the undirected edge has been traversed, from each edge set to which the traversed edge belongs. Such an approach can leverage a vector graphics API that can be hardware accelerated to efficiently render the shape data.

25 Claims, 22 Drawing Sheets

(56) References Cited

U.S. PATENT DOCUMENTS

| | | | |
|---|---|---|---|
| 2002/0143823 A1 | 10/2002 | Stevens | |
| 2003/0081679 A1 | 5/2003 | Kesaniemi | |
| 2003/0098862 A1 | 5/2003 | Hunt et al. | |
| 2004/0125116 A1 | 7/2004 | Lee et al. | |
| 2004/0208370 A1* | 10/2004 | Whatmough | 345/441 |
| 2006/0033759 A1 | 2/2006 | Guo et al. | |
| 2007/0153004 A1 | 7/2007 | Airey et al. | |

OTHER PUBLICATIONS

PCT Patent Application No. PCT/CA2009/001343 Search Report dated Nov. 3, 2009.
http://www.eprg.org/research/SVG/flash2svg/swfformat.php, published at least as early as Aug. 13, 2009.
Robert Reinhardt and Snow Dowd, Adobe Flash CS3 Professional Bible, 2007, Wiley Publishing, Inc.
SWF File Format Specification, Version 9, Adobe, Jun. 2007.
Steve Probets, "Flash and SVG", http://www.eprg.org/research/SVG/flash2svg/, Apr. 5, 2000.
Steve Probets, "How Flash Animation is managed by an SWF to SVG Translation Package", http://www.eprg.org/research/SVG/flash2svg/swfsvganim.php, Jan. 6, 2000.
Steve Probets, "Semantics of Macromedia's Flash (SWF) Format and its Relationship to SVG", http://www.eprg.org/research/SVG/flash2svg/swfformat.php, Jan. 6, 2000.
Office Action dated Oct. 10, 2012, U.S. Appl. No. 12/565,270.
Final Office Action dated Jan. 17, 2013, U.S. Appl. No. 12/565,278.
USPTO, US Office Action relating to U.S. Appl. No. 12/565,278 dated Dec. 30, 2013.

* cited by examiner

Fill Style 1:
    V1 -> [ E1, E3 ]
    V2 -> [ E1, E2 ]
    V3 -> [ E2, E3 ]

FIG. 7

```
Paint fillPaint = new Color(0,0,0);
Path p = new Path();
p.moveTo(3200,0);
p.lineTo(6400,4800);
p.lineTo(0,4800);
p.lineTo(3200,0);
```

FIG. 8

```
        <DefineShape
            <LineStyles>
168             <Style width="180" color="Color(0,0,255)"/>
            </LineStyles>
            <FillStyles>
170             <Solid color="Color(0,255,0)"/>
                <Solid color="Color(255,0,0)"/>
            </FillStyles>
            <StyleChangeRecord
172             lineStyle="1"
                fillStyle1="2"
                moveTo="Coord(3200,4800)"/>
            <CurvedEdgeRecord
174             controlDelta="Coord(-6400,-2400)"
                delta="Coord(6400,-2400)"/>
            <StyleChangeRecord
176             fillStyle1="1"/>
            <StraightEdgeRecord
178             delta="Coord(3200,2400)"/>
            <StraightEdgeRecord
180             delta="Coord(-3200,2400)"/>
            <StyleChangeRecord
182             fillStyle0="2"/>
            <StraightEdgeRecord
184             delta="Coord(0,-4800)"/>
            <EndShapeRecord/>
        </DefineShape>
```

188 — Line Style 1:
V1 -> [ E1, E3, E4 ]
V2 -> [ E1, E2, E4 ]
V3 -> [ E2, E3 ]

190 — Fill Style 1:
V1 -> [ E1, E4 ]
V2 -> [ E1, E4 ]

192 — Fill Style 2:
V1 -> [ E3, E4 ]
V2 -> [ E2, E4 ]
V3 -> [ E2, E3 ]

FIG. 12

194 — 
```
Paint strokePaint = new Color(0,0,255);
Path strokePath = new Path();
strokePath.moveTo(3200,4800);
strokePath.curveTo(-3200,2400,3200,0);
strokePath.lineTo(6400,2400);
strokePath.lineTo(3200,4800);
strokePath.lineTo(3200,0);
```

196 —
```
Paint fillPaint1 = new Color(0,255,0);
Path fillPath1 = new Path();
fillPath1.moveTo(3200,4800);
fillPath1.curveTo(-3200,2400,3200,0);
fillPath1.lineTo(3200,4800);
```

198 —
```
Paint fillPaint2 = new Color(255,0,0);
Path fillPath2 = new Path();
fillPath2.moveTo(3200,4800);
fillPath2.lineTo(3200,0);
fillPath2.lineTo(6400,2400);
fillPath2.lineTo(3200,4800);
```

FIG. 13

```
<DefineMorphShape>
    <MorphFillStyles>
        <MorphSolidFill>
            <StartColor color="(255,255,0)"/>
            <EndColor color="(0,255,255)"/>
        </MorphSolidFill>
    </MorphFillStyles>
    <MorphLineStyles>
        <MorphSolidLine>
            <StartColor color="(0,0,255)"/>
            <EndColor color="(255,0,0)"/>
        </MorphSolidLine>
    </MorphLineStyles>
    <StartShape>
        <StyleChangeRecord
            lineStyle="1"
            fillStyle1="1"
            moveTo="Coord(0,0)"/>
        <StraightEdgeRecord
            delta="Coord(6400,0)"/>
        <StraightEdgeRecord
            delta="Coord(0,4800)"/>
        <StraightEdgeRecord
            delta="Coord(-6400,0)"/>
        <StraightEdgeRecord
            delta="Coord(0,-4800)"/>
        <EndShapeRecord/>
    </StartShape>
```

- 212: MorphFillStyles block
- 214: MorphLineStyles block
- 216: StartShape block
- 220: StyleChangeRecord
- 222, 224, 226, 228: StraightEdgeRecord entries

FIG. 15A

```
Paint strokePaint = new Color(127.5,0,127.5);
Path strokePath = new Path();
strokePath.moveTo(0,1200);
strokePath.curveTo(1200,0,4800,0);
strokePath.curveTo(6400,1200,6400,3600);
strokePath.curveTo(4800,4800,1600,4800);
strokePath.curveTo(0,3600,0,1200);

Paint fillPaint = new Color(127.5, 255, 127.5);
Path fillPath = new Path();
fillPath.moveTo(0,1200);
fillPath.curveTo(1200,0,4800,0);
fillPath.curveTo(6400,1200,6400,3600);
fillPath.curveTo(4800,4800,1600,4800);
fillPath.curveTo(0,3600,0,1200);
```

FIG. 19

CONVERSION OF SWF SHAPE DEFINITIONS FOR VECTOR GRAPHICS RENDERING

CROSS REFERENCE TO RELATED APPLICATIONS

This application claims the benefit of priority of U.S. Provisional Patent Application No. 61/173,080 filed Apr. 27, 2009, which is incorporated herein by reference in its entirety.

FIELD

The present application relates generally to computer-based graphics. More particularly, the present application relates to file formats used to render graphics.

BACKGROUND

Websites typically display text and static graphics through the use of the hypertext markup language (HTML). In order to add animation and interactivity to these websites, one approach is to use the Adobe® Shockwave Flash (SWF) file format from Adobe Systems Incorporated. Such files are most often played using the Adobe Flash® Player, or equivalent software or browser plugins, such as Gnash.

A shape definition in the SWF file format comprises a sequence of directed edges that each can have one line style index and a pair of fill style indices (one for the left side of the edge and one for the right side of the edge, relative to the forward direction of the edge). The fill style indices begin at index 1, with a value of 0 denoting the absence of an associated style.

One way of rendering SWF file shapes is to use a scan-line renderer, which can be very processor-intensive; this can be particularly problematic in the context of small handheld devices with resource limitations such as slower processing speeds and reliance on battery power. It would be desirable to use a vector graphics API (application program interface) to render SWF file shapes because of its potential to efficiently render graphics files of a suitable format. However, there are inherent incompatibilities between SWF shape definitions and the way that paths are specified for processing by a vector graphics API.

For example, if a vector graphics API-based renderer traverses the edges of a shape in the order specified in the SWF file, the resulting rendered image may not be the same as if rendered by the Flash player, or it may not be possible to render or convert.

One problem is that a SWF file can include a number of moveto statements. A vector graphics API interprets any moveto statement as an instruction to "close" a portion of a path that is being rendered for a given fill style, thereby causing a region of the screen to be filled with that fill style. This can result in incorrect rendering of a SWF shape definition.

Another problem is that vector graphics APIs do not allow multiple fill styles per edge, while this is permitted in the SWF file definition. So, when a vector graphics API encounters an edge with two fill styles, it may not be able to properly convert edges with two fill styles.

There are also certain inefficiencies involved in the rendering process after edge traversal.

BRIEF DESCRIPTION OF THE DRAWINGS

Embodiments will now be described, by way of example only, with reference to the attached Figures, wherein:

FIG. 7 illustrates a path style graph representation, generated according to a method of an embodiment of the present application, based on the SWF shape definition represented in FIG. 5.

FIG. 8 illustrates a vector graphics shape definition including a vector graphics path generated based on the path style graph representation of FIG. 7.

FIG. 10 illustrates an XML representation of a SWF shape definition contained in a structured binary SWF file, the SWF shape definition including a plurality of fill styles.

FIG. 12 illustrates a shape data structure including three path style graph representations, generated according to a method of an embodiment of the present application, based on the contents of the SWF shape definition represented by FIG. 10.

FIG. 13 illustrates a vector graphics shape definition including three vector graphics path definitions generated based on the SWF shape definition represented by FIG. 10.

FIGS. 15A and 15B illustrate an XML representation of a SWF morph shape definition contained in a structured binary SWF file, the SWF morph shape definition including a morph line style and a morph fill style.

FIG. 19 illustrates a vector graphics shape definition including two vector graphics path definitions generated based on the SWF morph shape definition represented by FIGS. 15A and 15B.

DETAILED DESCRIPTION

Figure 1A:
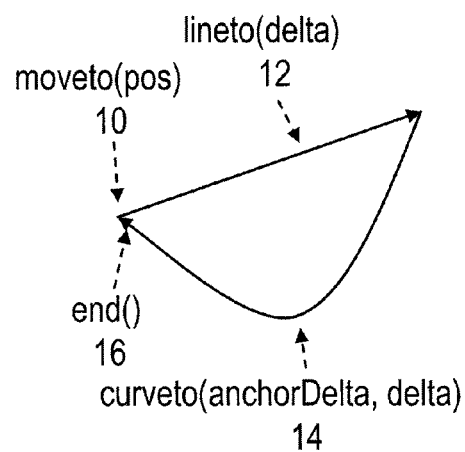
FIG. 1A illustrates four shape record types, along with the associated rendered result.

Generally, the present application provides a method and device for converting or transforming a shape definition specified in a SWF file into a vector graphics shape definition including one or more vector graphics path definitions that can then be used by a vector graphics API to render the contents of the SWF shape definition. Each vector graphics path definition is based on directed edges in the SWF shape definition having a path style, such as either a line style or a fill style, in common. A vector graphics path is created by traversing undirected edges of a graph represented by a graph representation, and by removing an undirected edge, after the undirected edge has been traversed, from each edge set to which the traversed edge belongs. Embodiments described herein can leverage a vector graphics API that can be hardware accelerated to efficiently render the shape data, such as in a mobile device.

In an embodiment, the present application provides a processor-implemented method of converting a SWF shape definition, including a first plurality of directed edges having a first path style in common, into a first vector graphics path definition corresponding to the first path style. The first path style can be one of a line style and a fill style. The method includes the following steps: i) creating a first path style graph representation corresponding to the first path style, based on mapping the first plurality of directed edges of the SWF shape definition having the first path style in common to a first plurality of vertices and undirected edges, and generating and storing connectivity information relating to the first plurality of vertices and undirected edges, the first path style graph representation including first path style information and a first graph representation; ii) creating a first vector graphics path by traversing undirected edges of a graph represented by the first graph representation and by removing an undirected edge, after the undirected edge has been traversed, from each edge set to which the traversed edge belongs; and iii) creating the first vector graphics path definition including the first vector graphics path and the first path style information.

Removing the undirected edge from the edge set after the edge has been traversed can include: a) selecting an initial-vertex; b) traversing a selected edge in an initial-vertex edge set identifying those undirected edges connected to the initial-vertex, ending at a terminal-vertex; and c) removing the selected edge from the initial-vertex edge set and from a terminal-vertex edge set identifying those undirected edges connected to the terminal-vertex.

Steps a) through c) can be repeated with the terminal-vertex from the previous step c) being selected as the initial-vertex in the current step a). Steps a) through c) can be repeated for a subsequent initial-vertex when a previously selected vertex has no remaining edges in its edge set.

Generating and storing connectivity information relating to the first plurality of vertices and undirected edges can include: converting a directed-edge record of the SWF shape definition to a first vertex, a second vertex, and an undirected edge in the first path style graph representation, the undirected edge connecting the first and second vertices, and one of the first vertex and the second vertex being created based on a current position prior to the directed edge record; adding the undirected edge to a first edge set identifying those undirected edges connected to the first vertex; and adding the undirected edge to a second edge set identifying those undirected edges connected to the second vertex.

The edge set can be implemented as a linked list of edges connected to that vertex. The method can further include creating, for each vertex, a vertex hash based on co-ordinates of the vertex, and mapping each vertex to a set of all adjoining undirected edges in a vertex-specific edge set using the vertex to edge set edge hash.

The method can further include identifying the plurality of directed edges in the SWF shape definition having the path style in common. The path style information in the path style graph representation can be in a different format than the path style information in the vector graphics path definition.

The SWF shape definition can include a second plurality of directed edges having a second path style in common. The method can further include converting the SWF shape definition into a second vector graphics path definition corresponding to the second path style, and can include the following steps: iv) creating a second path style graph representation corresponding to the second path style, based on mapping the second plurality of directed edges of the SWF shape definition having the second path style in common to a second plurality of vertices and undirected edges, and generating and storing connectivity information relating to the second plurality of vertices and undirected edges, the second path style graph representation including second path style information and a second graph representation; v) creating a second vector graphics path by traversing undirected edges of a graph represented by the second graph representation and by removing an undirected edge, after the undirected edge has been traversed, from each edge set to which the traversed edge belongs; and vi) creating the second vector graphics path definition including the second vector graphics path and the second path style information.

The processor-implemented method can further include: creating, for each path style, a path style hash based on an associated stored path style index, and mapping the path style index to the path style graph representation using the path style hash.

The processor-implemented method can further include: creating a shape data structure including a unique path style graph representation for each path style; and creating a vector graphics shape definition including a unique vector graphics path definition for each path style.

In another embodiment, the present application provides a mobile device including a processor and a computer readable memory in communication with the processor. The memory stores statements and instructions for execution by the processor to perform a method of converting a SWF shape definition, including a first plurality of directed edges having a first path style in common, into a first vector graphics path definition corresponding to the first path style. The first path style can be one of a line style and a fill style. The method includes: i) creating a first path style graph representation corresponding to the first path style, based on mapping the first plurality of directed edges of the SWF shape definition having the first path style in common to a first plurality of vertices and undirected edges, and generating and storing connectivity information relating to the first plurality of vertices and undirected edges, the first path style graph representation including first path style information and a first graph representation; ii) creating a first vector graphics path by traversing undirected edges of a graph represented by the first graph representation and by removing an undirected edge, after the undirected edge has been traversed, from each edge set to which the traversed edge belongs; and iii) creating the first vector graphics path definition including the first vector graphics path and the first path style information.

In the method executed by the processor, removing the undirected edge from the edge set after the edge has been traversed can include: a) selecting an initial-vertex; b) traversing a selected edge in an initial-vertex edge set identifying those undirected edges connected to the initial-vertex, ending at a terminal-vertex; and c) removing the selected edge from the initial-vertex edge set and from a terminal-vertex edge set identifying those undirected edges connected to the terminal-vertex. Steps a) through c) can be repeated with the terminal-vertex from the previous step c) being selected as the initial-vertex in the current step a). Steps a) through c) can be repeated for a subsequent initial-vertex when a previously selected vertex has no remaining edges in its edge set.

In the method executed by the processor, generating and storing connectivity information relating to the first plurality of vertices and undirected edges can include: converting a directed-edge record of the SWF shape definition to a first vertex, a second vertex, and an undirected edge in the first path style graph representation, the undirected edge connecting the first and second vertices, and one of the first vertex and the second vertex being created based on a current position prior to conversion of the directed edge record; adding the undirected edge to a first edge set identifying those undirected edges connected to the first vertex; and adding the undirected edge to a second edge set identifying those undirected edges connected to the second vertex.

The edge set for a respective vertex can implemented as a linked list of edges connected to that vertex. The method can further include creating, for each vertex, a vertex hash based on co-ordinates of the vertex, and mapping each vertex to a set of all adjoining undirected edges in a vertex-specific edge set using the vertex hash.

The SWF shape definition can include a second plurality of directed edges having a second path style in common. The method can further include converting the SWF shape definition into a second vector graphics path definition corresponding to the second path style, and can include the following steps: iv) creating a second path style graph representation corresponding to the second path style, based on mapping the second plurality of directed edges of the SWF shape definition having the second path style in common to a second plurality of vertices and undirected edges, and generating and storing connectivity information relating to the second plurality of vertices and undirected edges, the second path style graph representation including second path style information and a second graph representation; v) creating a second vector graphics path by traversing undirected edges of a graph represented by the second graph representation and by removing an undirected edge, after the undirected edge has been traversed, from each edge set to which the traversed edge belongs; and vi) creating the second vector graphics path definition including the second vector graphics path and the second path style information.

The method executed by the processor can further include: creating, for each path style, a path style hash based on an associated stored path style index, and mapping the path style index to the path style graph representation using the path style hash.

The method executed by the processor can further include: creating a shape data structure including a unique path style graph representation for each path style; and creating a vector graphics shape definition including a unique vector graphics path definition for each path style.

In a further embodiment, the present application provides a computer readable memory storing statements and instructions for execution by a processor to perform a method of converting a SWF shape definition, including a plurality of directed edges having a path style in common, into a vector graphics path definition corresponding to the path style. The method includes: creating a path style graph representation corresponding to the path style, based on mapping the plurality of directed edges of the SWF shape definition having the path style in common to a plurality of vertices and undirected edges, and generating and storing connectivity information relating to the plurality of vertices and undirected edges, the path style graph representation including path style information and a graph representation; creating a vector graphics path by traversing undirected edges of a graph represented by the graph representation and by removing an undirected edge, after the undirected edge has been traversed, from each edge set to which the traversed edge belongs; and creating the vector graphics path definition including the vector graphics path and the path style information.

Other aspects and features will become apparent to those ordinarily skilled in the art upon review of the following description of specific embodiments in conjunction with the accompanying figures.

A path is the basis for a vector object, and is made up of a list of edges. A path can include a combination of straight edges and curved edges. A path can also include a command to move to a different location, permitting multiple visually "disconnected" components to be represented by the same path. A path can be open or closed. An open path includes unconnected end points, while start and end points of a closed path meet to close a shape or figure.

The term "SWF file" as used herein represents a structured binary file, the structure of which is in accordance with the SWF file format specification for delivery of vector graphics, text, video, and sound over the Internet, and which is supported by Adobe® Flash® player software. A SWF file includes at least one directed edge. Each directed edge can have its own line style and pair of fill styles. The pair of fill styles specifies graphics styles according to which regions on respective sides of an edge are to be filled. For example, a left fill style for a directed edge in a SWF file path can be defined by the term FillStyle0, and a right fill style defined by the term FillStyle1.

The term "SWF shape definition" as used herein represents a shape definition and its contents, as used and represented in a SWF file format. The tags DefineShape, DefineShape2, DefineShape3 and DefineShape4 are examples of shape definition tags. Contents of the SWF shape definition can include a record header, a shape character identifier, shape bounds, and shape information stored in a SHAPEWITHSTYLE structure. The SHAPEWITHSTYLE structure includes a number of shape records, as described later.

The term "SWF morph shape definition" as used herein represents a morph shape definition and its contents, as used and represented in a SWF file format. A morphed shape specifies the start shape and the end shape, each of which must have the same number of edges for a proper morph to occur. A SWF morph shape definition can include: a morph line style and a morph fill style; a number of directed start edges and an equal number of directed end edges associated with a morph path style, the morph path style including a start path style and an end path style. The timeline of the morph will determine the intermediate number of frames between the start shape and the end shape. The number of frames determines the number of morph ratios, which in turn determines the number of paths to be created. The tags DefineMorphShape and DefineMorphShape2 are examples of morph shape definition tags which define the start and end states of a morph sequence. Contents of the SWF morph shape definition can include a record header, a morph shape character identifier, start and end bounds, and morph fill and line style information. Morph fill style and line style information is stored in the same manner as for a standard shape; however, each line/fill consists of interleaved information based on a single style type to accommodate morphing.

The term "vector graphics path" as used herein represents a path that can be unambiguously and properly rendered by a vector graphics API. A vector graphics path can include a stroke paint, which is equivalent to a line style, and a fill paint, which is equivalent to a fill style. The terms line style and fill style will be used herein in relation to a vector graphics path, with the understanding that they can represent a stroke paint and a fill paint, respectively. According to embodiments described herein, a vector graphics path includes one or more edges in which every edge has the same line style and fill style combination. The one or more edges can include straight edges or curved edges, or both.

The term "vector graphics path definition" as used herein represents a vector graphics path and its associated line style or fill style information.

The term "vector graphics shape definition" as used herein includes one or more vector graphics path definitions, which can then be properly rendered by a vector graphics renderer. Each vector graphics path can represent all edges having the same line style or the same fill style. For example, if a SWF file shape definition includes three different line styles and/or fill styles, a corresponding vector graphics shape definition includes three unique vector graphics paths, one for each defined line and fill style in the shape definition.

The term "path style" as used herein represents a line style or a fill style for a vector graphics path. For example, the path style for an open path is its line style. If a fill style is specified for an open, or non-closed, path, it simply will not be used. The path style for a closed path is its line style or fill style. Path style indices begin at 1, and a value of 0 indicates that the path style is not in use.

As used herein, the term "graph" takes on its computer science meaning as a data structure comprising a set of nodes, called vertices, and a set of edges that establish the connections between the vertices. Such a graph, or data structure, can be stored in a computer readable memory or a database as a table of keys and related values, such as a set of vertices and associated edges.

The term "graph representation" as used herein is a representation of a graph. For example, a graph representation can include mapping from a vertex to an edge set, the edge set including all edges connected to the vertex. For a particular path style, the graph representation can include such mapping for each vertex connected to one or more edges having the particular path style. The graph representation can be used to enable traversal of the graph it represents.

The term "path style graph representation' as used herein corresponds to a particular path style, and includes path style information and the graph representation. A path style graph representation can be a mapping from the particular path style to the graph representation, where the graph represented by the graph representation has the ability to be traversed.

The term "shape data structure" as used herein represents a mapping from each path style in a shape definition to corresponding graph representations. For example, for a shape definition having three path styles, the shape data structure includes three path style graph representations. Edges and vertices can be included in more than one path style graph representation. The shape data structure includes a mapping from each path style to a single graph representation.

As described herein, the line style for an edge or path is described by an associated line style index value. A line style array stores all line styles for a given shape or path and indexes each one by an associated unique line style index value, typically beginning with a value of 1 for the first entry. The expressions LSI1, LSI2, etc. as used herein refer to the stored line style associated with line style index values of 1, 2, etc.

Similarly, the fill style for an edge or path is described by an associated fill style index value. A fill style array stores all fill styles for a given shape or path and indexes each one by an associated unique fill style index value, typically beginning with a value of 1 for the first entry. The expressions FSI1, FSI2, etc. as used herein refer to the stored fill style defined by fill style index values of 1, 2, etc. An edge or path having a fill style index value of zero has no fill, and implies that the fill style array has no entries or is nonexistent.

A vector graphics API, as it is defined in this document, is an API that can represent paths that comprise moveto, lineto, and curveto segments. Each path can comprise multiple disconnected components and can specify a single line style and fill style per path.

One example of a vector graphics API is javax.microedition.vectorgraphics. Another example is OpenVG. Embodiments described herein can work with any vector graphics API. In embodiments, the minimum information required for a vector graphics API includes: the ability to generate paths which can include one of more of moveto, lineto and curveto elements or components; and the ability to store stroke and fill styles.

In examples described herein, the vector graphics API specifies its coordinates in absolute terms. In the SWF specification, moveto statements use absolute positions, while deltas in lineto and curveto statements are specified using relative positions with respect to the current position.

SWF files have shape definitions, which define what an object with a particular identifier will look like. Place Objects states where the shape with a given identifier should be placed.

A SWF file specifies shapes as a sequence of four types of records: style change records; straight edge records; curved edge records; and end shape records. A style change record contains up to four pieces of information, such as: a change in line style, a change in left fill style, a change in right fill style, or a move-to that changes the current drawing position. A line style refers to the stroke that is applied to a path, while a fill style refers to the pattern that fills the region defined by a path.

FIG. 1A illustrates the four shape record types, along with the rendered result. A moveto statement 10 starts a straight edge at position "pos". A straight edge record specifies a line segment as an offset from the current drawing position. A lineto (delta) statement 12 indicates the end point of the straight edge relative to the starting position. A curved edge record, on the other hand, specifies a Bezier curve as two offset coordinates relative to the current drawing position. The curved edge record can include a curveto statement 14, which shows the two coordinates of the anchor position, and the end curve position. Lastly, an end shape record 16, which is the last record in a shape definition, is used to specify that there are no more shape records for the current shape definition.

Figure 1B:
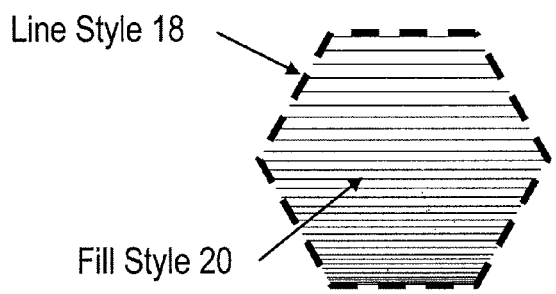
FIG. 1B illustrates simple visual examples of a line style and a fill style.

FIG. 1B illustrates a simple visual example of a line style 18 and fill style 20.

Figure 2:
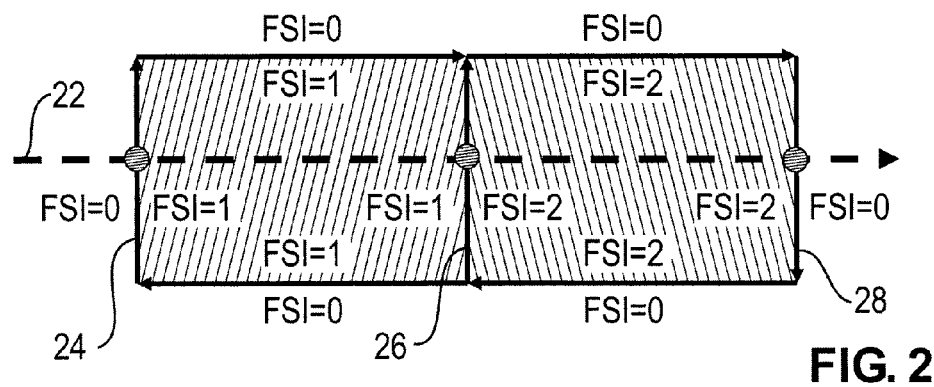
FIG. 2 illustrates an example of a rendered output, such as from a scanline renderer, of a shape defined by a SWF shape definition in a SWF file.

FIG. 2 illustrates an example of a rendered output of a shape defined by a SWF shape definition in a SWF file, showing fill style index values for relevant fill styles for the purposes of discussion. In a SWF shape definition, each directed edge has either one or two associated fill styles (a fill style of 0 means that there is no fill style). Arrows shown in FIG. 2 at the ends of the directed edges are simply for illustration, and are not part of the rendered output. A dotted line 22 represents a direction in relation to which a renderer, such as a scanline renderer, can traverse a row of pixels.

A first directed edge 24 has a right-hand fill style of 1 and a left-hand fill style of 0, with respect to the "upward" direction of the edge 24. As it crosses the edge 24, the renderer will begin filling pixels it walks with a fill style of 1, which in this case is simply a particular color. Afterwards, the scanline hits a directed edge 26 whose right-hand fill style is 2. The renderer then subsequently begins filling pixels using fill style 2. Finally, it encounters a directed edge 28 (directed "downwards" in FIG. 2) whose left-hand fill style is 0. In response, the renderer stops filling in pixels for the remainder of the scanline. This approach is based on a set of directed edges with appropriate line styles and fill styles. Vector graphics renderers do not support multiple fill styles for each edge, and typically do not support the concept of directed edges.

Embodiments of the present application convert Flash's internal SWF file to a vector graphics format. For example, a SWF shape definition is converted into a vector graphics shape definition including one or more vector graphics path definitions, which can then be properly rendered by a vector graphics renderer. An intermediate structure or graph representation can be created and stored in memory before obtaining the vector graphics path. Converting the SWF shape definition to a vector graphics path can comprise converting a SWF line style to a vector graphic stroke, or converting a SWF fill style to a vector graphic fill.

The first goal is to build our structure. All of the edges of a particular path style (i.e., line style or fill style) can be identified, grouped together, and then traversed, such as by their edge connectivity. Edge connectivity does not exist in the SWF file itself, so in such implementations the information is gathered and built in to a graph.

A method of an embodiment can be described as a two step process: building a graph structure that represents connectivity information; and traversing the graph structure to create the paths. For example, the method can walk all of the edges, then put them in an appropriate path style structure based on their style. The style is mapped to a graph. In one embodiment, for every vertex, the method keeps track of all of its adjoining edges in an edge set, such as an edge list. The graph structure can be implemented and traversed in different ways. An alternative implementation includes adjacency matrices. Maps represent an exemplary embodiment of the graph structure.

Figure 3:
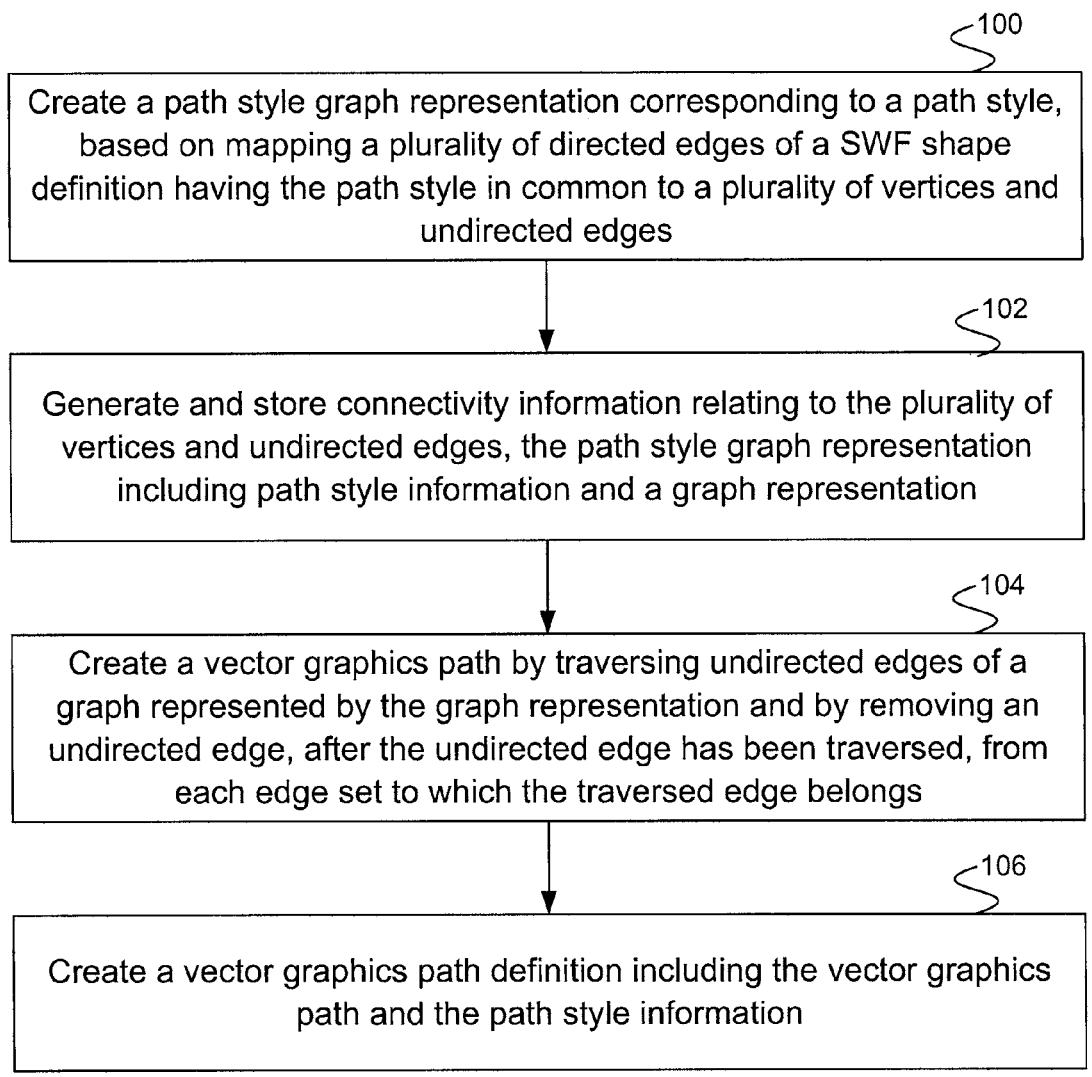
FIG. 3 is a flowchart illustrating a processor-implemented method of converting a SWF file shape definition into a vector graphics path definition according to an embodiment of the present application.

FIG. 3 is a flowchart illustrating a processor-implemented method according to an embodiment of the present application. The processor-implemented method converts a SWF shape definition, including a plurality of directed edges having a path style in common, into a vector graphics path definition corresponding to the path style. In step 100, a path style graph representation is created, corresponding to the path style, based on mapping the plurality of directed edges of the SWF shape definition having the path style in common to a plurality of vertices and undirected edges. Step 102 comprises generating and storing connectivity information relating to the plurality of vertices and undirected edges. The path style graph representation includes path style information and a graph representation. In step 104, a vector graphics path is created by traversing undirected edges of a graph represented by the graph representation and by removing an undirected edge, after the undirected edge has been traversed, from each edge set to which the traversed edge belongs. In step 106, the vector graphics path definition is created including the vector graphics path and the path style information.

Embodiments described herein remove a traversed edge, rather than marking it as visited. If a traversed edge is marked as visited or traversed, the method must include checking whether the edge is traversed or not. This can be an iterative process. There is increased efficiency according to embodiments described herein in removing a traversed edge from an edge set or edge list, rather than marking the edge as traversed and then having to spend processing power checking, possibly repeatedly, whether or not the edge has been marked as traversed. Therefore, in an embodiment, an undirected edge is removed, after the undirected edge has been traversed, from each edge set to which the traversed edge belongs. In an embodiment, each edge set for a respective vertex can be implemented as a linked list of edges connected to that vertex.

Each path style has an index. In an embodiment, the method can further include creating, for each path style, a path style hash based on a stored path style index. The method can include mapping the path style index to the path style graph representation using the path style hash. In an embodiment, the method can further include creating, for each vertex, a vertex hash based on the co-ordinates of the vertex, and mapping each vertex to a set of all adjoining undirected edges in a vertex-specific edge set using the vertex hash. A vertex hash can be created based on the co-ordinates of the vertex. A pointer can be used to point to the location of the values of the vertex co-ordinates.

Using hashes to produce the graph represented by the path style graph representation enables the use of a constant-size lookup table or hash table. An edge can be looked up directly using its vertex. There is no need to iterate over all of the edges. Consequently, the time required to look up an edge does not depend on the number of edges in the edge set, or edge list. This can be referred to as the function having a big O notation of 1.

Figure 4:
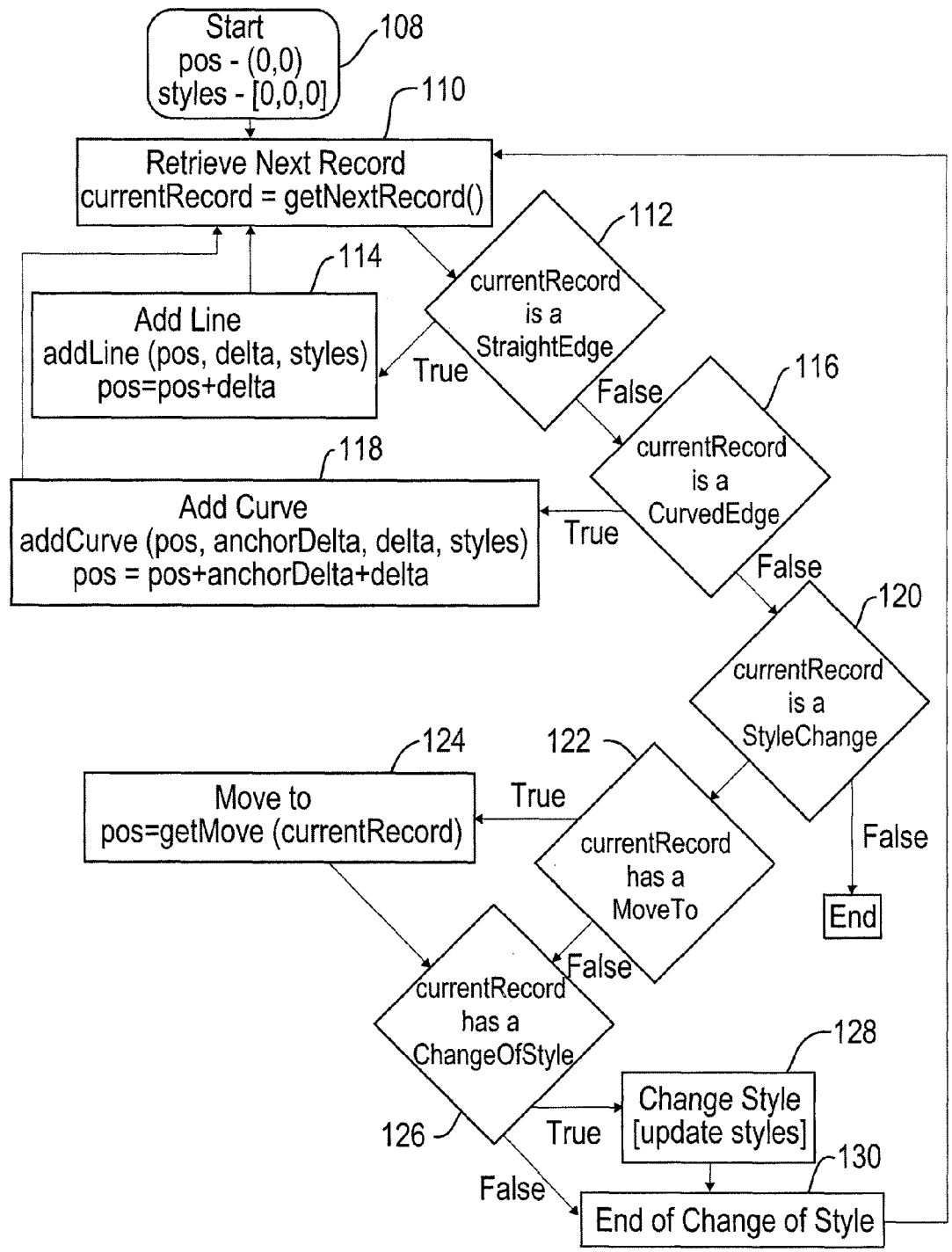
FIG. 4 is a flowchart illustrating steps involved in creating a shape data structure from a SWF shape definition according to an embodiment of the present application.

A method of converting a SWF shape definition into a vector graphics path definition according to an embodiment includes mapping a set of edges of the SWF shape definition having a path style in common to a shape data structure. In another embodiment, a graph representation is constructed or created based on edges of the SWF shape definition having a common path style. The shape data structure includes a mapping of the path style to the graph representation. Steps involved in creating or mapping to the graph representation to generate the data structure will now be described in relation to the method illustrated in FIG. 4.

At the outset, in step 108, the following state information is initialized: set the current position to (0, 0); set the current line style, current left fill style, and current right fill style to 0; and setup the path style graph representation. In step 110, the next shape definition record is retrieved. Shape definition records in the SWF file are processed in turn according to the following method steps.

When a straight edge record is encountered after a true output from decision step 112, the method proceeds in step 114 to calculate the end vertex of the line by adding the record's delta to the current position. Then a straight edge is created between a vertex at the current position and the end vertex. This edge is added to the path style graph representation for each style of the current edge. Finally, the current position is set equal to the end vertex position.

When a curved edge record is encountered after a false output from decision step 112 and a true output from decision step 116, the method proceeds in step 118 to calculate both the anchor vertex, and the end vertex. The anchor vertex is produced by adding the record's anchor delta to the current position and the end vertex is created by adding the record's delta to the anchor vertex position. Then a curved edge is created from the vertex at the current position, the anchor vertex, and the end vertex. This edge can then be added to the path style graph representation for each style of the current edge. Finally, the current position can be set equal to the end vertex position.

When a style change record is encountered after a false output from decision steps 112 and 116 and a true output from decision step 120, and the record contains a move-to after a determination in step 122, then the method proceeds in step 124 to set the current position equal to the move-to position. If, based on a false determination in step 122 and a true output from decision step 126, the style change record contains a line style, a left fill style, or a right-fill style, then in step 128 the current styles are updated appropriately. Decision step 126 can also be reached based on a true determination in step 122, and the method proceeding to step 124.

When the end of the style change record is reached in step 130, the method returns to step 110 to retrieve the next record. When an end shape record is encountered, then there are no more shape records to process.

A first example embodiment will be described in relation to FIGS. 5, 6, 7 and 8. In this embodiment, for edges having the same path style, a path style graph representation is generated. The path style graph representation includes path style information and a graph representation. A graph represented by the graph representation is traversed to build a vector graphics path for all shapes having that path style. A vector graphics path definition is created, including the vector graphics path and the path style information.

As mentioned earlier, a SWF shape definition does not maintain any connectivity information. Such connectivity information is used for generating vector graphic paths. To solve this problem, a style edge data structure, or path style graph structure, is created to represent edge connectivity for all edges having a path style. An embodiment of the present application comprises a path style graph structure generator arranged to add new edges to the structure, and a graph structure traverser, to traverse the edges of the graph structure.

Figure 5:
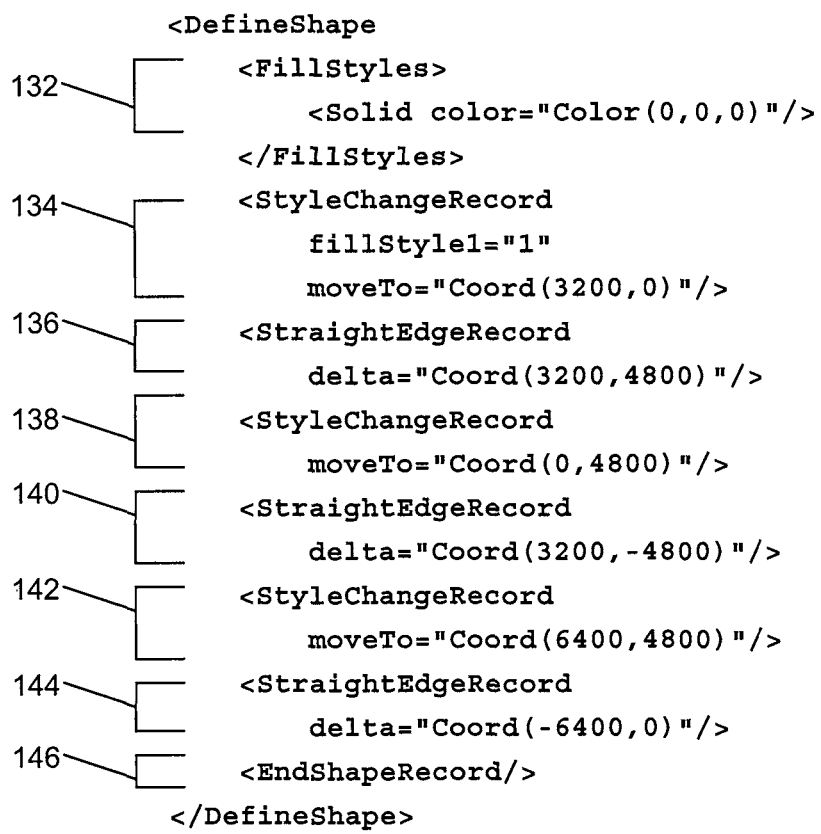
FIG. 5 illustrates an eXtensible Markup Language (XML) representation of a SWF shape definition contained in a structured binary SWF file.

FIG. 5 illustrates an XML representation of contents of a SWF shape definition contained in a structured binary SWF file. This human-readable representation is provided for ease of discussion and illustration. Embodiments described herein perform conversion with respect to contents of the structured binary SWF file. Such an XML representation can be generated from a binary SWF file using commercially available tools that parse the binary file format. The XML representation in FIG. 5 shows SWF file information that is relevant to embodiments described herein. For example, shape definition information such as shape bounds and character identifier are omitted from FIG. 5.

A portion 132 of the XML code in the shape definition in FIG. 5 indicates that there is only a single defined fill style, which is later referenced as fill style index value "1", corresponding to the color (0,0,0), which is black. There are no defined line styles in this example. Therefore, this embodiment will generate a single path style graph representation and a single vector graphics path, since all records in the shape definition have the same path style.

It is worth noting that the SWF file format stores all x-y coordinates as integers, usually in a unit of measurement called a twip. In the SWF format, a twip is ½₀th of a logical pixel. A logical pixel is the same as a screen pixel when the rendered file is played, without scaling, at 100%. As such, in the example of FIG. 5, the rendered output fits within a window of 320×240 pixels, which corresponds to a standard small resolution. Also, coordinates used herein refer to (0,0) as the top left corner of a rendering region using X,Y coordinates, and positive displacement is down and to the right.

Figure 6:
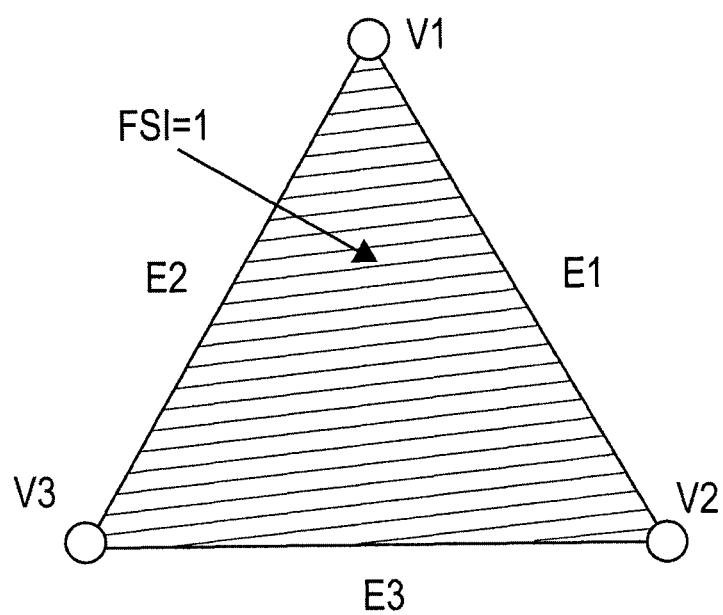
FIG. 6 depicts the shape that would be rendered, using embodiments described herein, by the Flash player for the shape defined by the SWF shape definition represented in FIG. 5.

FIG. 6 depicts the shape that would be rendered, using embodiments described herein, by the Flash player for the shape defined by the SWF shape definition represented in FIG. 5. Attempting to directly render the SWF file represented in FIG. 5 using a vector graphics API in the absence of embodiments described herein would end up drawing absolutely nothing. The API uses the fill style to fill in a polygon determined by a connected path consisting of at least two connected, consecutive edges. Since a moveto record follows each lineto in this example, no two consecutive edges form a connected path; said another way, one edge does not continue where the preceding edge left off. Therefore, no filling with the fill style takes place, resulting in no pixels being filled.

An example embodiment of creating a path style graph structure for the shape defined in the SWF file represented by FIG. 5 will now be described. In XML record 134, a style change record is encountered with a fill style index value. The defined fillStyle1 is a right fill style, as defined in the SWF standard. This indicates that the right fill style from this record onward, until a style change, is defined by fill style index 1. The record also indicates a move to certain coordinates. The moveto coordinate (3200,0) is defined by an embodiment as a first vertex V1, since moveto statements use absolute coordinates. The vertex V1 is added to the path style graph structure in anticipation of associating it with edges connected to V1.

In record 136, the straight edge record includes a delta of (3200,4800), which is a relative value, placing the end of the first straight edge at (6400,3200), which is defined as V2. This first straight edge E1 began at V1 and ends at V2. V2 is added to the path style graph structure. Accordingly, the edge E1 is added to an edge set, or edge list, of V1 and V2. While the term edge list will be used below, it is to be understood that the edge set can be implemented in manners other than an edge list.

Record 138 includes a moveto statement with a coordinate (0, 4800), which is defined as vertex V3. V3 is added to the path style graph structure. In record 140, the straight edge statement has a relative delta of (3200,−4800), bringing the current position to (3200,0), which corresponds to vertex V1. Accordingly, record 140 created edge E2 by moving from V3 to V1. Thus, edge E2 is added to both V3's and V1's edge lists.

In record 142 another moveto brings the current position to (6400,4800), which is the location of V2. Record 144 indicates that a straight edge extends (−6400,0) from the current position, ending at V3. Therefore, edge E3 is defined as having endpoints V2 and V3, and is added to the edge lists for both of those vertices. Record 146 indicates the end of the shape record, providing an indication that the current edge shape record or graph for this path style is now complete.

FIG. 7 illustrates a shape data structure, or path style graph representation, generated according to a method of an embodiment of the present application, based on the SWF shape definition represented in FIG. 5. This can also be described as a path style graph structure, or path style data structure. In the case of FIG. 7, the shape data structure comprises a single path style graph representation. The path style graph representation includes path style information, shown as Fill Style 1, and a graph representation, shown as the rest of FIG. 7. This intermediary representation is created in order to produce the desired output, which is a vector graphics path, or vector graphics path definition. The graph representation can be provided using each vertex as a key. The set of edges in the vertex's edge list represent the value associated with the key.

While the vertices are shown in FIG. 7 as V1, V2 and V3, it is to be understood that a computer readable memory can store these keys as the coordinates defining each vertex. Such coordinates were defined earlier and are shown in FIG. 6. Similarly, each edge shown as E1, E2 and E3 can be stored in a computer readable memory as a set of coordinates defining the bounds of the edge. In the case of a straight edge, coordinates of the start and end point can be stored. For a curved edge, coordinates of the start and end points are stored, along with coordinates of the control point or anchor point.

After producing the path style graph representation, a graph represented by the graph representation is traversed to create the vector graphics path. Related steps are now described. For each path style, an empty path can be created and edges belonging to the path style are processed as follows, in an embodiment:

(i) For each traversed edge, include the information from the current edge in the vector graphics path.

(ii) If the edge being processed is part of a new connected component, add a move-to segment to the current path, which moves to the first vertex of this edge, then apply (i) and continue.

(iii) If the edge being processed is not part of a new connected component, add a move-to segment to the current path, which moves to the first vertex of the current component, then apply (i) and continue.

In an embodiment, the method can be described as follows. In a set of edges associated with a particular path style (line or fill style), select any one of the vertices as a starting point. Consider all of the edges that the vertex belongs to, based on the mapping. Select the first edge and start creating the path. Create a moveto at the starting point, and then add a lineto or curveto to the adjoining vertex. The edge that was just traversed is then removed from the edge lists of both vertices to which it was connected, so that it is not traversed again in building the path.

This process continues for each edge that is connected to a vertex. In some situations, the method can have a choice of different traversal orders. When there are no more edges to traverse based on connected edges, another remaining vertex in the graph is arbitrarily selected as a new start point, with an associated moveto command in the graph. This continues until no more vertices remain.

In an embodiment, traversing components of the path style graph structure includes: i) selecting an initial-vertex; ii) traversing a selected edge in an initial-vertex edge list identifying those edges connected to the initial-vertex, ending at a terminal-vertex; and iii) removing the selected edge from the initial-vertex edge list and from a terminal-vertex edge list identifying those undirected edges connected to the terminal-vertex.

Methods described above will now be described in relation to the path style graph representation in FIG. 7 in order to produce the vector graphics path definition of FIG. 8 as an output. The vector graphics path definition in FIG. 8 includes path style information, shown as the first line in the figure, and the vector graphics path, shown as the rest of FIG. 8. A vertex in the graph representation is arbitrarily selected as the starting point for traversing the graph. In this example, V1 is selected as the starting point. In terms of the path output, a moveto is created to the first vertex (3200,0). Any edge in the edge set for V1 can be the first edge to be traversed. In this example, edge E1 is traversed first, bringing the current position to V2. In terms of path output, the next statement is a lineto to V2, which is represented in absolute terms (6400, 4800). After having traversed edge E1, the edge E1 is removed from the edge list for V1 and from the edge list for V2.

Continuing at the current position of the vertex V2, the next edge in the edge list for V2 is selected. The next edge can be any remaining edge from the set of edges in the edge list for V2. Due to the removal of E1 from its edge list, the only remaining edge is E2. Traversing E2 brings the current position to V3 having absolute coordinates (0,4800). A corresponding lineto statement is added to the vector graphics path. The edge E2 is then removed from every edge list in which it is found.

From the current position of the vertex V3, the edge E3 is the only remaining edge in the edge list for V3. Therefore, the method traverses the edge E3, returning to the position (3200, 0) corresponding to V1, thus closing the shape. A lineto statement with coordinates (3200,0) is added to the vector graphics path. The edge E3 is then removed from all of the edge lists in which it was listed. Since all of the edges in the graph are now removed, the method determines that there are no more edges to process and that the vector graphics path is complete. A vector graphics API will correctly render the vector graphics path shown in FIG. 8 as the intended output shown in FIG. 6.

For a defined shape that is more complex than the triangle of FIG. 6, a method of an embodiment of the present application could output a different vector graphics path than the path shown in FIG. 8, depending on the starting vertex selected, and on the order in which the edges are traversed. This can be the case, for example, if the defined shape has a path that includes two visually disconnected shapes of the same fill style. As such, a method of an embodiment of the present application can convert the same binary SWF file into one or more render-equivalent vector graphics paths. That is to say, any vector graphics path created from the same binary SWF file by a method described herein will be properly rendered by a vector graphics API to create the same defined shape.

Figure 9:
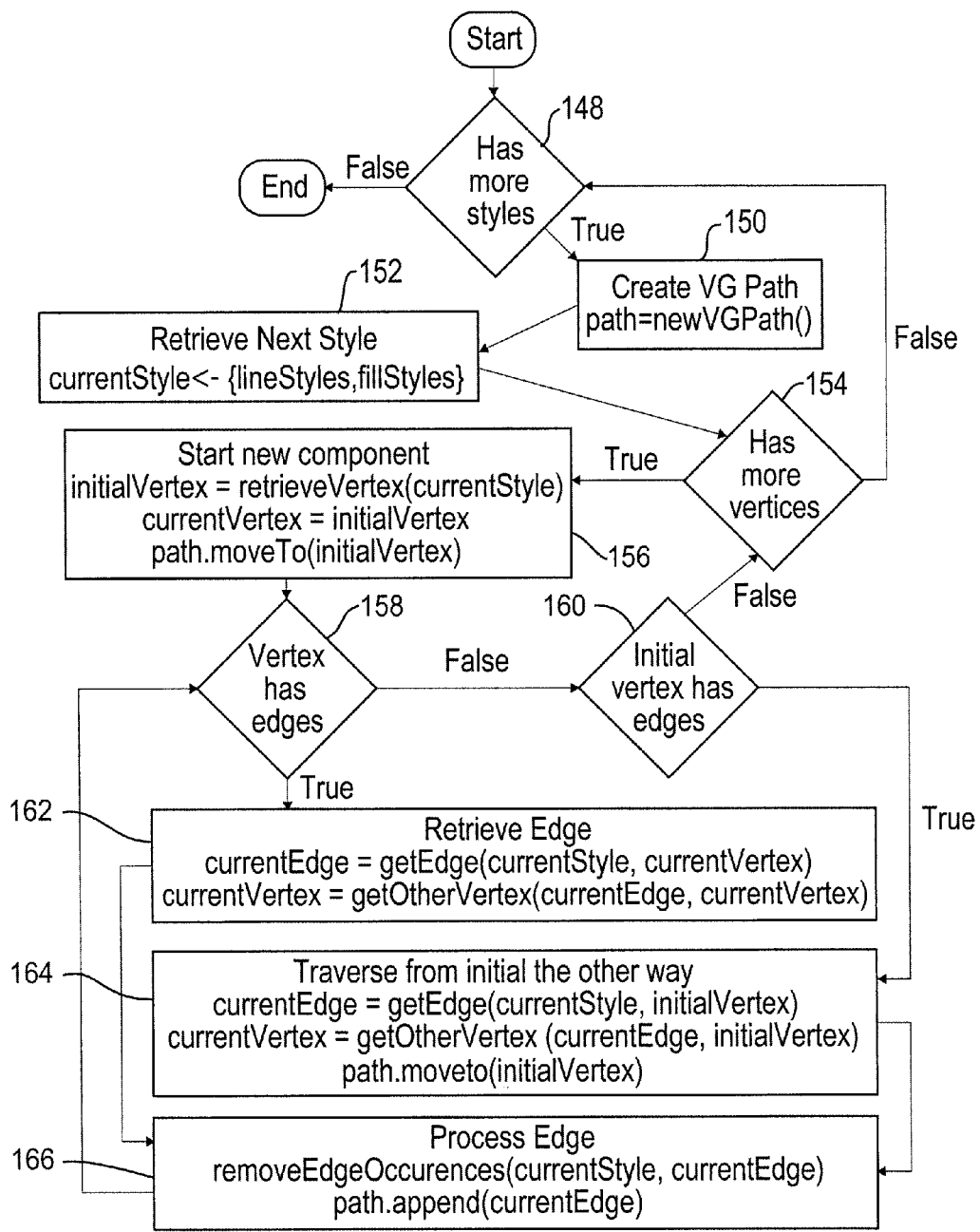
FIG. 9 illustrates and describes steps in a method for creating path data for a vector graphics shape definition from a shape data structure.

FIG. 9 illustrates and describes steps in a method for creating path data for a vector graphics shape definition from a shape data structure. In step 148, a determination is made whether there are any more styles. If the determination is true, then in step 150 a new vector graphics path is created. The method sets the current style to the next available line or fill style. In step 154, a determination is made whether there are more vertices in the shape data structure for the current path style. If step 154 determines that there are no more vertices, the method returns to step 148. If there are more vertices, the method proceeds in step 156 to start a new component. An initial-vertex is retrieved, and the current-vertex is set to be the initial-vertex. A moveto statement is generated in order to bring the path to the current vertex. If a determination in step 158 indicates that the vertex has no edges, and step 160 determines that the initial-vertex has edges, then the method returns to step 154.

If the vertex has edges, the method proceeds in step 162 to retrieve the edge. The edge information is retrieved, including the current style and current vertex. The other vertex for the edge is obtained based on the current vertex and edge information. Once step 162 has been completed, the method proceeds to process the edge in step 166. Processing the edge includes removing the edge occurrences from the vector graphics path for the current path style after the edge has been traversed. At the conclusion of step 166, the method returns to step 158.

If the vertex has no edges, but the initial-vertex has edges, the method proceeds to step 164, in which an edge is traversed from the initial-vertex in a way or direction that is different than how it was previously traversed. At the end of step 164, a moveto is used to return to the initial-vertex. After completing step 164, the method proceeds once again to step 166 in which the edge is removed from the vector graphics path after the edge has been traversed. At the conclusion of step 166, the method returns to step 158.

Another issue addressed by embodiments of the present application is that a standard vector graphics API only allows a path to have a single fill style. In order to accommodate this, embodiments described herein walk or traverse one fill style, or path style, at a time.

Instead of defining a fill style for each side of an edge as part of an edge record, as in the SWF definition, embodiments described herein identify or group together a first set of edges associated with a first fill style. A second set of edges is associated with a second fill style. An edge can be part of more than one set of edges, or part of more than one graph representation, such as if the edge has a different fill style on both sides.

In rendering standard SWF files, edge direction is particularly important when rendering a fill style, since an edge can have a different fill style on either side of the edge. To determine the fill style to use in rendering, knowledge of the direction of the edge is required. The direction of the delta defines the edge direction. Therefore, standard SWF files store fill style data regarding a directed edge, since edge direction information is required for knowing how to render a left-hand fill style and a right-hand fill style.

Embodiments of the application can be described as storing fill style data regarding one or more undirected edges. In a path style graph representation of an embodiment, edge direction is not stored or used. A different path style graph representation is created for each path style, such as a fill style. In an exemplary path style graph representation, connectivity information is stored, such as in relation to vertices and edges associated with the path style. When a graph represented by the path style graph representation is walked/traversed to create the paths, each path style is traversed individually, such as one at a time.

Figure 11:
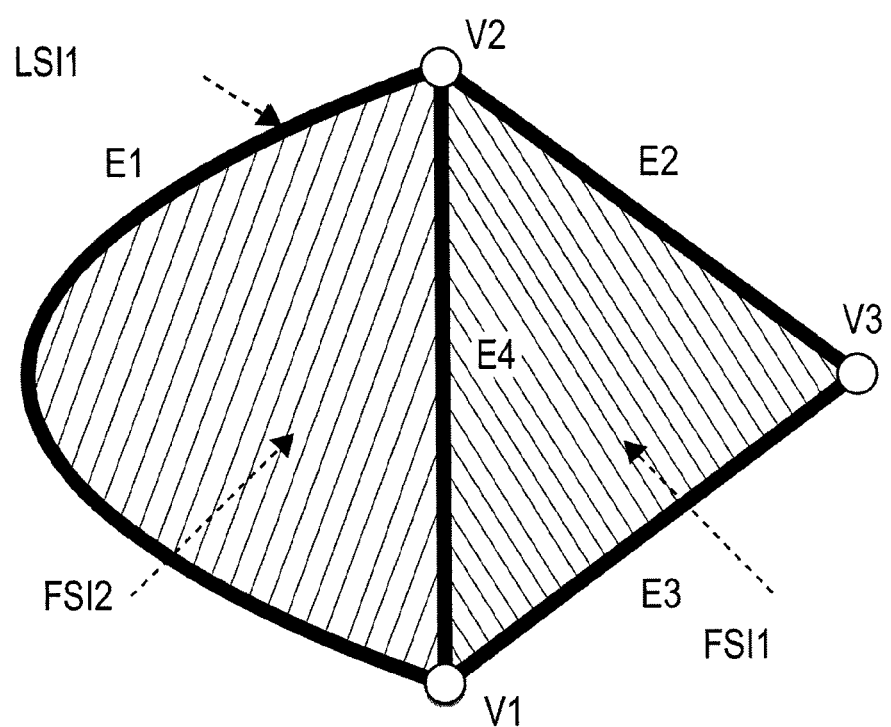
FIG. 11 illustrates a shape that would be rendered, using embodiments described herein, by the Flash player for the SWF shape definition defined in FIG. 10.

FIG. 10 illustrates an XML representation of contents of a structured binary SWF file having a shape definition including a plurality of fill styles. FIG. 11 illustrates a shape that would be rendered, using embodiments described herein, by the Flash player for the SWF shape definition defined in FIG. 10. Attempting to directly render the SWF shape definition represented in FIG. 10 using a vector graphics API in the absence of embodiments described herein would not result in the shape shown in FIG. 11.

An example embodiment describing creating a path style graph representation of the SWF shape definition represented in FIG. 10 will now be described. A portion 168 of the XML code indicates that the defined shape has one line style, which is later referenced as line style index value "1", or LSI1. A portion 170 of the XML code indicates that the defined shape has two fill styles: color (0,255,0), which is green, corresponding to fill style index value "1", or FSI1; and color (255,0,0), which is red, corresponding to fill style index value "2", or FSI2. Therefore, this shape definition includes three different path styles: one line style and two fill styles. Embodiments of the present application will therefore output three different path style graph representations, and three different vector graphics paths, one for each path style. In another embodiment, the line and fill style index values can be stored together in a single path style matrix.

Record 172 is a style change record, specifying that from this point forward a line style corresponding to line style index value "1" and a right fill style corresponding to fill style index value "2" will be used. A method according to an embodiment will therefore add any edges encountered into sets of edges for both of those path styles. Record 172 also specifies a move to (3200,4800) which is V1 in FIG. 11.

In record 174, a curved edge is defined, with the control delta being relative to the previous coordinates. Therefore, starting at V1, and moving (6400,−2400) with the anchor, or control, delta of (−6400,−2400), which is not shown in FIG. 11, the curved edge E1 ends up at V2. The edge E1 is then added to the edge list for V1 and the edge list for V2.

However, each path style has its own path style graph representation. Therefore, in this embodiment, E1 is added to the edge list for V1 and in the edge list for V2 in the path style graph representation for LSI1. Similarly, edge E1 is also added to the edge list for V1 and in the edge list for V2 in the path style graph representation for FSI2.

In record 176, a style change record is encountered, indicating a change in right fill style (fillStyle1) from FSI2, which was a red fill style, to FSI1, or fill style index value "1", which is a green fill style. Therefore, from this point forward, all edges encountered will be added, according to an embodiment, to a path style graph representation for LSI1 and a path style graph representation for FSI1.

Record 178 is a straight edge record, which moves (3200, 2400) in a relative sense, ending at the location V3, defining edge E2. The edge E2 is then added to the edge list for V2 and the edge list for V3 in both the path style graph representation for LSI1 and the path style graph representation for FSI1.

Similarly, record 180 defines edge E3 which extends from V3 to V1. E3 is then added to both FSI1 and LSI1 path style graph representations, in the edge lists for V3 and V1. Record 182 is a style change record indicating a left fill style (fillStyle0) of fill style index value "2". Record 184 defines straight edge E4, which is added to the path style graph representation for FSI2. At the end, E4 is found in all three path style graph representations for LSI1, FSI1 and FSI2. Upon encountering the end shape record in FIG. 10, the method completes its steps of path style graph representation creation.

FIG. 12 illustrates a shape data structure 186 including three path style graph representations 188, 190 and 192, generated according to a method of an embodiment of the present application, based on the contents of the SWF shape definition represented by FIG. 10. Each path style graph representation includes path style information, shown as the first line, and a graph representation, shown as the remaining lines. This intermediary representation is created in order to produce the desired output, which is a vector graphics shape definition including a plurality of vector graphics path definitions. The path style graph representation can be provided using each vertex as a key. The set of edges in the vertex's edge list represent the value associated with the key.

While the vertices are shown in FIG. 12 as V1, V2 and V3, it is to be understood that a computer readable memory can store these keys as the coordinates defining each vertex. Such coordinates were defined earlier and are shown in FIG. 11. Similarly, each edge shown as E1, E2, E3 and E4 can be stored in a computer readable memory as a set of coordinates defining the bounds of the edge. In the case of a straight edge, coordinates of the start and end point can be stored. For a curved edge, coordinates of the start and end points are stored, along with coordinates of the control point or anchor point.

A method of creating a vector graphics shape definition based on a plurality of path style graphs will now be described. By traversing the structure as defined in the three path style graphs in the shape data structure of FIG. 12, three different vector graphics paths will be created, one for the line style, and one for each of the two fill styles. A resulting path output, including three vector graphics shape definitions, is shown in FIG. 13.

The method begins by walking the first path style graph 188 corresponding to a line style value index of 1, or LS1. Starting at V1, the first edge is selected, which is E1. Starting at the coordinates of V1 (3200,4800), the coordinates of E1 are used to draw the straight edge path that extends to V2. E1 is removed from the edge list for both V1 and V2, to indicate that the edge has been added to the vector graphics path. Now at V2, since E1 has been removed from the edge list, the next edge is E2. Therefore, a path command to draw E2 is generated, bringing the current position to V3 (6400, 2400). Edge E2 is then removed from the edge lists for both V2 and V3. Now at V3, examining its edge list, only edge E3 remains. A command to draw the edge E3 is created, bringing the current position back to V1 (3200,4800). Edge E3 is then removed from both the edge lists. From V1, its edge list still contains edge E4; a corresponding path command is issued, bringing the current position to V2 (3200, 0). When edge E4 is removed from the edge lists for V1 and V2, all of the edges for the first path style graph have been traversed and creation of the first vector graphics path is complete. The associated vector graphics path definition 194 in FIG. 13 is created using the first vector graphics path and the path style information. The path style information can be provided in a vector graphic API-readable format similar to that shown in FIG. 13.

A similar process is used to walk or traverse the second path style graph representation 190 for fill style index value 1, FSI1, and for the third path style graph representation 192 for fill style index value 2 to generate their associated vector graphics paths and vector graphics path definitions 196 and 198, respectively.

A method of an embodiment of the present application could output different vector graphics paths and definitions than the paths and definitions shown in FIG. 13, depending on the starting vertex selected, and on the order in which the edges are traversed. A method of an embodiment of the present application can convert the same SWF shape definition into one or more render-equivalent vector graphics shape definitions including a plurality of render-equivalent vector graphics paths. That is to say, any vector graphics shape definition created from the same SWF shape definition by a method described herein will be properly rendered by a vector graphics API to create the same defined shape.

A method of an embodiment can also output a shape definition with different path formatting depending on parameters, such as path class definitions, of a particular vector graphics API with which the vector graphics shape definition is to be used. A system of an embodiment of the present application can include a path output generator.

In the above-described examples, the method is agnostic with respect to the order of traversing edges in a graph to generate the corresponding vector graphics path. There are certain instances in which steps can be taken to specify an order so that the shape defined by the vector graphics path is rendered more efficiently.

One scenario is particularly applicable with respect to line styles. A stroke can be an open shape. An initial-vertex can be chosen and available edges are traversed following a current position. It may be necessary to select another vertex if the vertex at the current position has no remaining unconverted edges. An unconverted edge is an edge for which conversion to a vector graphics path is pending. In embodiments described above where edges are removed after traversal, a vertex has no unconverted edges when there are no edges in the edge list for that vertex.

In an open shape, when selecting a subsequent starting point for path traversal, instead of simply selecting any remaining vertex, the method can return to the first vertex and determine if it has an unconverted edge. Alternatively, any previously traversed vertices can be examined to determine if any of those vertices has an unconverted edge, before arbitrarily selecting another vertex in the path.

Methods according to embodiments described above work properly without performing this ordering. The ordering steps can make the process more efficient, since it reduces the number of moveto commands and associated processing.

In another scenario, if a directed edge has the same fill style on both sides, a method according to an embodiment can omit a corresponding undirected edge from the path style graph for that fill style. The corresponding undirected edge is still added to the path style graph for the line style. This approach can be beneficial when the directed edge is not part of a closed shape.

There are also certain instances in which steps can be taken to specify an order of traversing edges in a graph to generate the corresponding vector graphics path, so that the defined shape is rendered properly.

An important feature of SWF files is their ability to support morphing between two different shapes. Morphing can include shape tweening, where the shape changes, and motion tweening, whereby the same shape is transformed by applying a matrix. Most vector graphics APIs have the capability to interpolate between two paths given some value between 0 and 1. Accordingly, a vector graphics API can be used to render a shape definition that morphs between two shapes (with the same number of segments) by interpolating over the edges in order, and creating the intermediate path(s).

The problem, however, is that there is no guarantee that if we were to create shape data structures for both the start and end shapes of a morph definition that the edges of each structure would be traversed in the same order when creating the associated vector graphics shape definition for a particular morph ratio. While this would still result in the start shape morphing into the end shape, it would not necessarily yield the intended intermediary shape result for the morph ratio in question.

Figure 14:
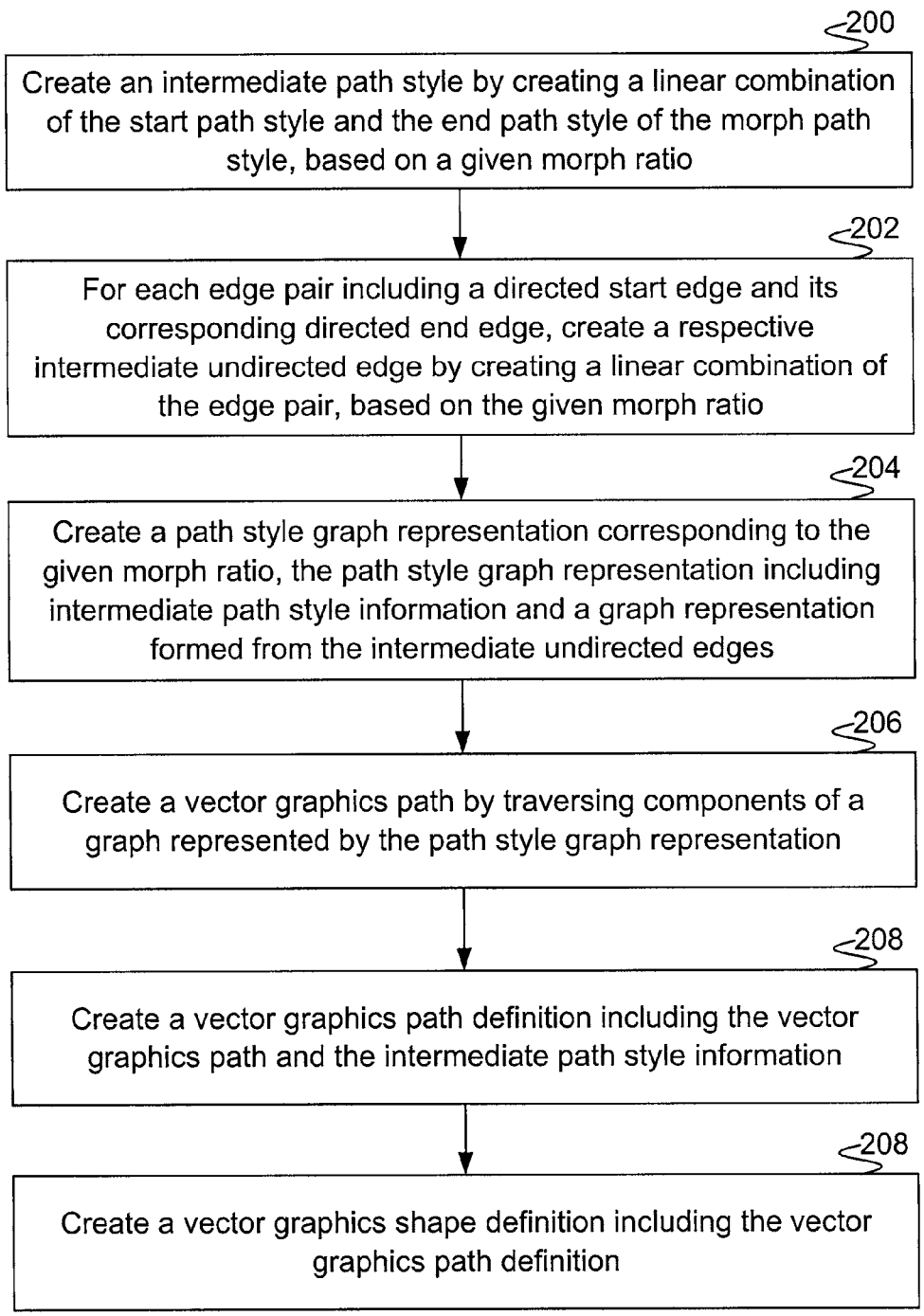
FIG. 14 is a flowchart illustrating a processor-implemented method of converting a SWF morph shape definition into a vector graphics shape definition corresponding to a given morph ratio according to an embodiment of the present application.

FIG. 14 illustrates a method of converting a SWF morph shape definition into a vector graphics shape definition according to an embodiment of the present application. The SWF morph shape definition includes a number of directed start edges and an equal number of directed end edges associated with a common morph path style. The vector graphics shape definition corresponds to the morph path style and a given morph ratio. The morph path style includes a start path style and an end path style. The method includes the following steps: a) creating an intermediate path style by creating a linear combination of the start path style and the end path style, based on the given morph ratio (step 200); b) for each edge pair including a directed start edge and its corresponding directed end edge, creating a respective intermediate undirected edge by creating a linear combination of the edge pair, based on the given morph ratio (step 202); c) creating a path style graph representation corresponding to the given morph ratio, the path style graph representation including intermediate path style information and a graph representation formed from the intermediate undirected edges (step 204); d) creating a vector graphics path by traversing components of a graph represented by the path style graph representation (step 206); e) creating the vector graphics path definition including the vector graphics path and the intermediate path style information (step 208); and f) creating a vector graphics shape definition including the vector graphics path definition (step 210).

The method described in relation to FIG. 14 describes steps used when there is a first common morph path style. In some examples, the SWF morph shape definition can further include a second number of directed start edges and an equal second number of corresponding directed end edges. The second number of directed start edges and the second number of directed end edges having a common second morph path style, the second morph path style including a second start path style and a second end path style, the vector graphics shape definition corresponding to the first morph path style and the second morph path style and the given morph ratio.

In such a scenario, the steps 200 to 210 in FIG. 14 are followed, with some variation. For example, the processor-implemented method, which can be performed in a mobile device, can be described as further including the following steps: g) creating a second intermediate path style by creating a linear combination of the second start path style and the second end path style, based on the given morph ratio; h) for each second edge pair including a directed start edge from the second number of directed start edges and its corresponding directed end edge from the second number of directed end edges, creating a respective second intermediate undirected edge by creating a linear combination of the second edge pair, based on the given morph ratio; i) creating a second path style graph representation corresponding to the given morph ratio, the second path style graph representation including second intermediate path style information and a second graph representation formed from the second intermediate undirected edges; j) creating a second vector graphics path by traversing components of a second graph represented by the second path style graph representation; k) creating a second vector graphics path definition including the second vector graphics path and the second intermediate path style information; and l) updating the vector graphics shape definition to include the second vector graphics path definition.

When the SWF morph shape definition defines a plurality of morph ratios, the processor-implemented method performed in the mobile device can further include performing steps g) to l) for each morph ratio.

The method can further include: m) creating a shape data structure including the vector graphics path definition created in step e) and the second vector graphics path definition. In that case, steps f) and l) can be performed based on the contents of the shape data structure.

The processor-implemented method can further include creating a set of edge pairs, each edge pair in the set of edge pairs comprising a unique one of the number of directed start edges and a corresponding directed end edge.

Figure 15B:
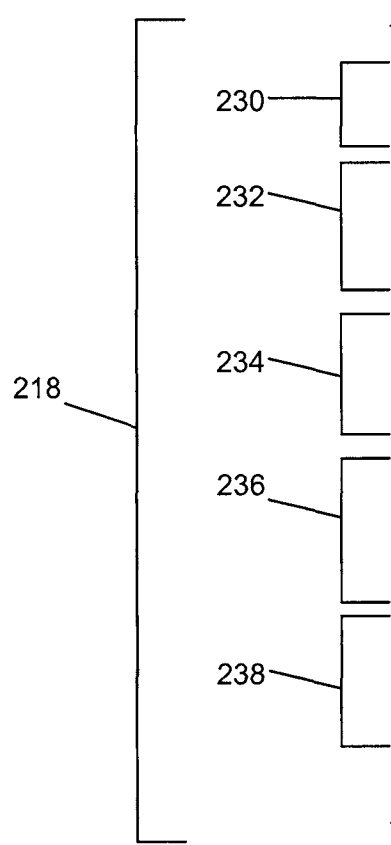

FIGS. 15A and 15B illustrate an XML representation of a SWF morph shape definition contained in a structured binary SWF file, the SWF morph shape definition including a morph line style and a morph fill style. A morphed shape specifies the start shape and the end shape, each of which must have the same number of edges for a proper morph to occur. Embodiments described herein can be adapted for morphing by specifying an order of traversal of edges in a path style graph in order to morph edges correctly.

Figure 16A:
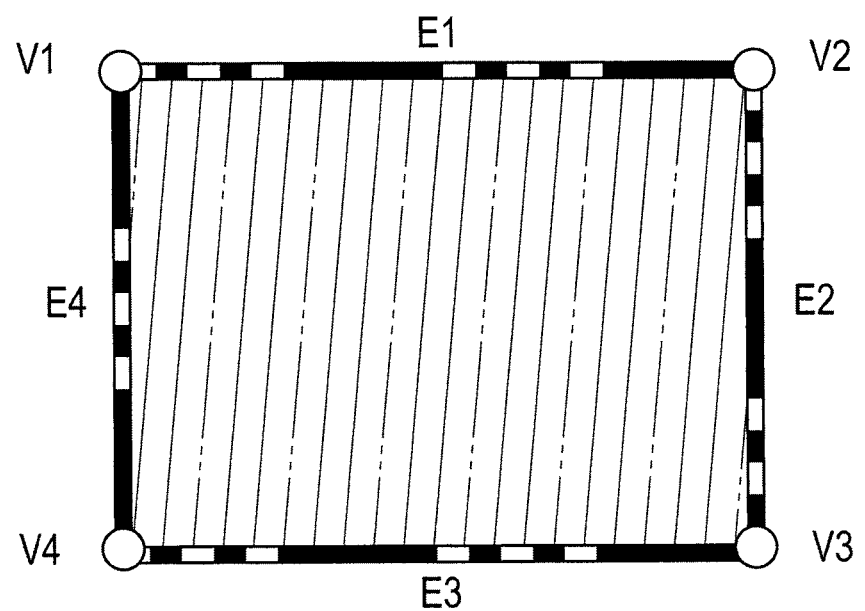
FIGS. 16A, 16B and 16C illustrate a shape that would be rendered by the Flash player for the SWF morph shape definition defined in FIGS. 15A and 15B for morph ratios of 0.0, 0.5 and 1.0, respectively.
Figure 16B:
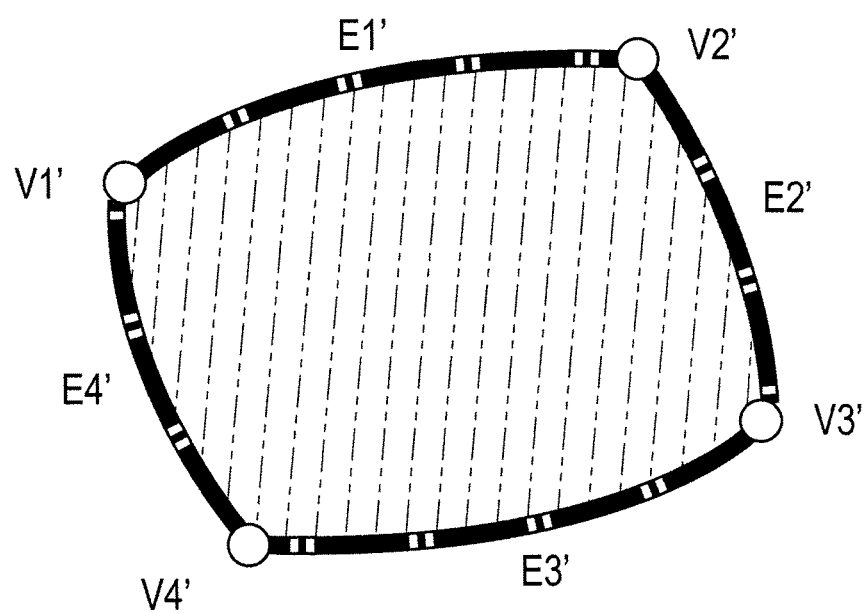
Figure 16C:
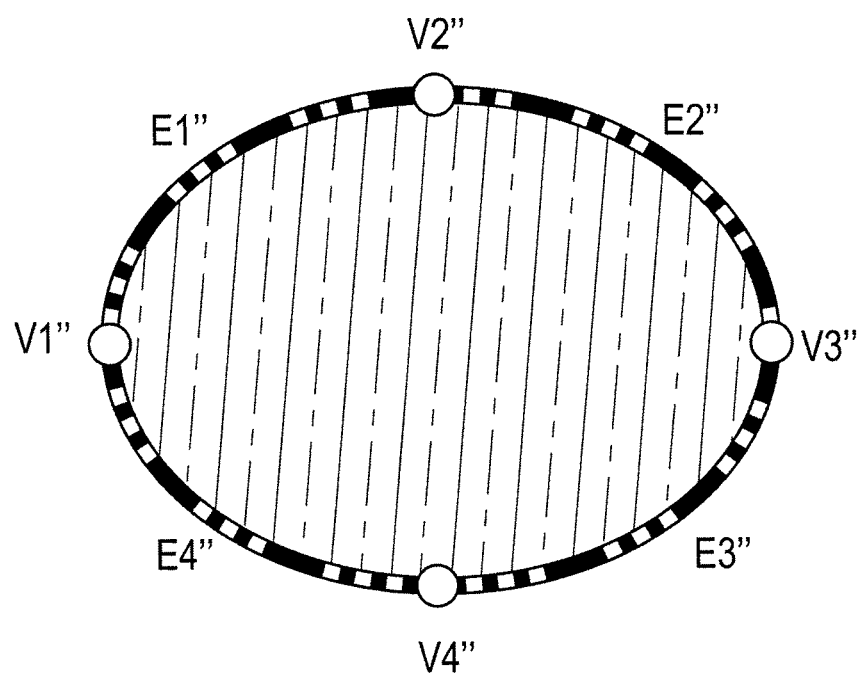

FIGS. 16A, 16B and 16C illustrate a shape that would be rendered by the Flash player for the SWF morph shape definition defined in FIG. 15 for morph ratios of 0.0, 0.5 and 1.0, respectively.

Referring back to FIG. 15A, a portion 212 of the XML representation defines a morph fill style by specifying a start color and an end color. The start color and end color pair is referred to by the same morph fill style index value, which in this case is 1, or MFSI1. In this case the morph start fill style color is (255,255,0), which is yellow, and the end morph fill style color is (0,255,255), which is aqua, or cyan. Similarly, a portion 214 of the XML representation defines a morph line style with a start value of (0,0,255), which is blue, and an end value of (255,0,0), which is red. The start color and end color pair is referred to by the same morph line style index value, which in this case is 1, or MLSI1.

A start shape record 216 in FIG. 15A and an end shape record 218 in FIG. 15B define styles and edges for the start and end shape of the morph. Style change records 220 and 230 in FIGS. 15A and 15B, respectively, define the line and fill style and starting coordinates for the start shape and end shape, respectively. The MFSI1 and LFSI1 values are specified only in style change record 220, but need not be specified elsewhere, since they each inherently include a start and end color pair, the values of which are obtained as required.

Straight edge records 222, 224, 226 and 228 in FIG. 15A define straight edges E1, E2, E3 and E4 shown in FIG. 16A, respectively. The value of V1 is taken from the moveto statement in style change record 220, and values for V2, V3 and V4 are determined based on the current position after the delta in the previous edge record. Edges can be added to an edge set for a vertex as described earlier, with the edge set being for the start shape at a morph ratio of 0.0.

Similarly, curved edge records 232, 234, 236 and 238 in FIG. 15B define curved edges E1", E2", E3" and E4" shown in FIG. 16C, respectively. The value of V1" is taken from the moveto statement in style change record 230, and values for V2", V3" and V4" are determined based on the current position after the delta in the previous edge record. Edges can be added to an edge set for a vertex as described earlier, with this edge set being for the end shape at a morph ratio of 1.0.

Based on the order in which they are presented in the morph shape definition, the straight edge records 222, 224, 226 and 228 are determined to correspond to the curved edge records 232, 234, 236 and 238, respectively.

Figure 17:
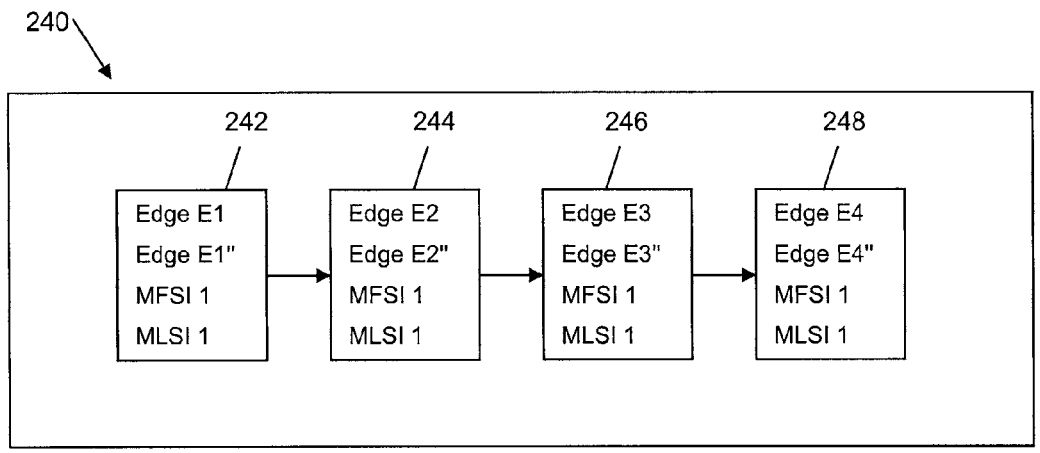
FIG. 17 illustrates a morph edge set used to generate a shape data structure for a plurality of morph ratios.

FIG. 17 illustrates a morph edge set, such as a morph edge list, 240 for the shape morphing defined in FIGS. 15A and 15B. The morph edge list 240 includes a plurality of edge pairs 242, 244, 246 and 248, one for each edge. Each edge pair comprises a start end and a corresponding end edge, and can include the associated morph line and fill style indices.

Linear interpolation methods or techniques can be used to calculate values of each edge and vertex for each morph ratio. For example, for a given morph ratio such as 0.5 a method of an embodiment of the present application interpolates the edges in this morph edge list to generate edges E1', E2', E3', and E4' shown in FIG. 16B. Morph ratio-specific line and fill styles for the edges in the morph ratio are calculated by interpolating the morph line and morph fill styles.

Figure 18:
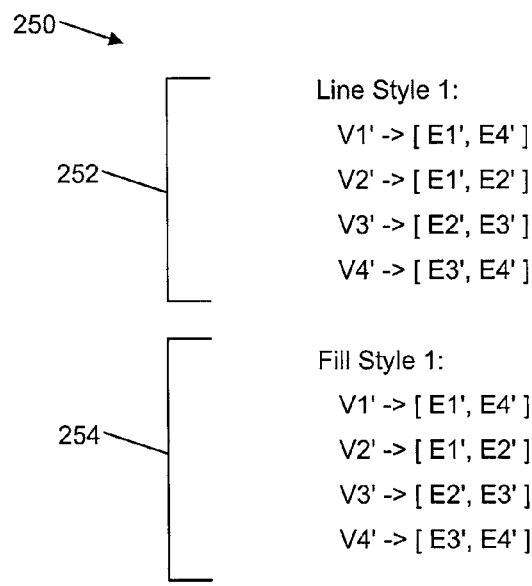
FIG. 18 illustrates a shape data structure including two path style graph representations, generated according to a method of an embodiment of the present application, based on path styles interpolated from the contents of the SWF morph shape definition represented by FIGS. 15A and 15B.

FIG. 18 illustrates a shape data structure 250 including two path style graph representations 252 and 254, generated according to a method of an embodiment of the present application, based on path styles interpolated from the SWF morph shape definition represented by FIGS. 15A and 15B. Each path style graph representation maps a particular path style to a single graph representation. Line Style 1 and Fill Style 1 in FIG. 18 represent the morph ratio-specific path styles, or intermediate path styles, which are distinct from both the start and end morph line style and morph fill style indices in the morph shape definition. The morph ratio-specific path styles are generated by interpolating the morph line and fill styles using the morph ratio.

The graph representation includes mappings from one or more vertices to corresponding edge sets, each edge set representing edges connected to each vertex. A particular edge or vertex can be included in more than one graph representation in the same shape data structure.

After the shape data structure 250 is created, a vector graphic path output is generated as per the shape data structure traversal method described above. A unique vector graphic path definition is output for each morph ratio, to enable proper rendering of the start and end shapes for each morph ratio.

FIG. 19 illustrates a vector graphics shape definition including two vector graphics path definitions generated based on the SWF morph shape definition represented by FIGS. 15A and B. The example shown in FIG. 19 is for a given morph ratio of 0.5. The vector graphics shape definition in FIG. 19 can be generated using the same methods previously described, based on a generated shape data structure.

Figure 20A:
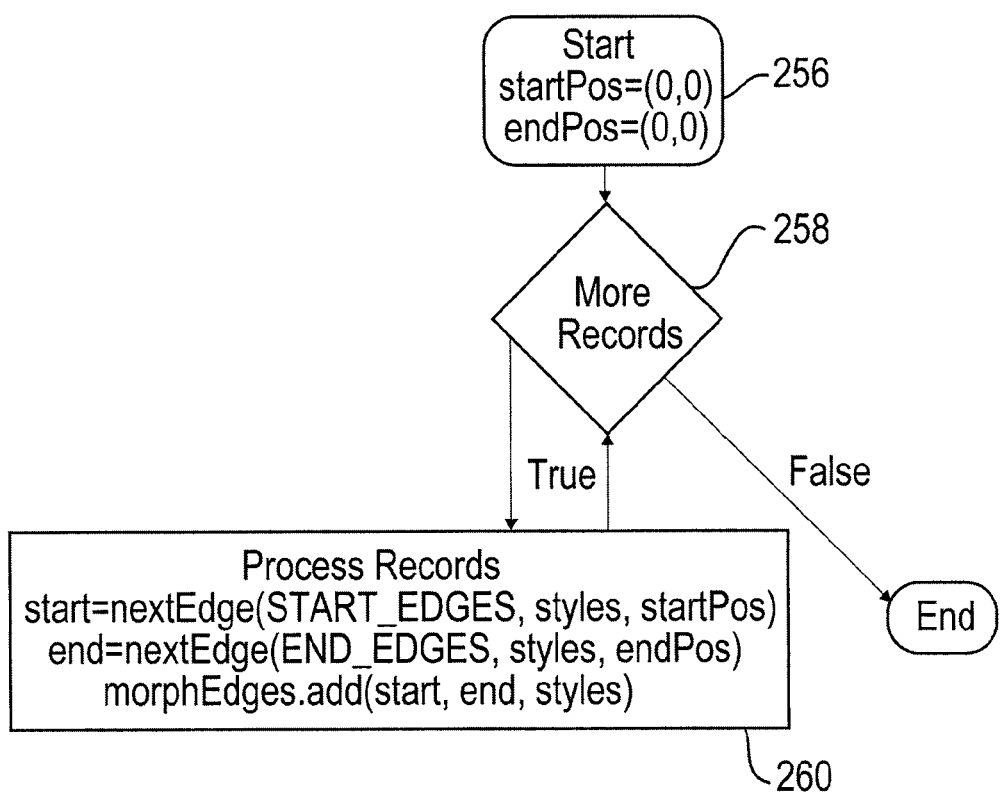
FIG. 20A is a flowchart illustrating steps involved in creating a morph edge set according to an embodiment in the case of morphing.

FIG. 20A is a flowchart illustrating steps involved in creating a morph edge set or list according to an embodiment in the case of morphing. In FIG. 20A, the start and end positions are initialized in step 256. In step 258, a determination is made whether there are more records. If not, the process ends. If so, the method proceeds to step 260 in which the records are processed in turn, based on the start edges and end edges in the morph path style, the morph path style including a start path style and an end path style.

Figure 20B:
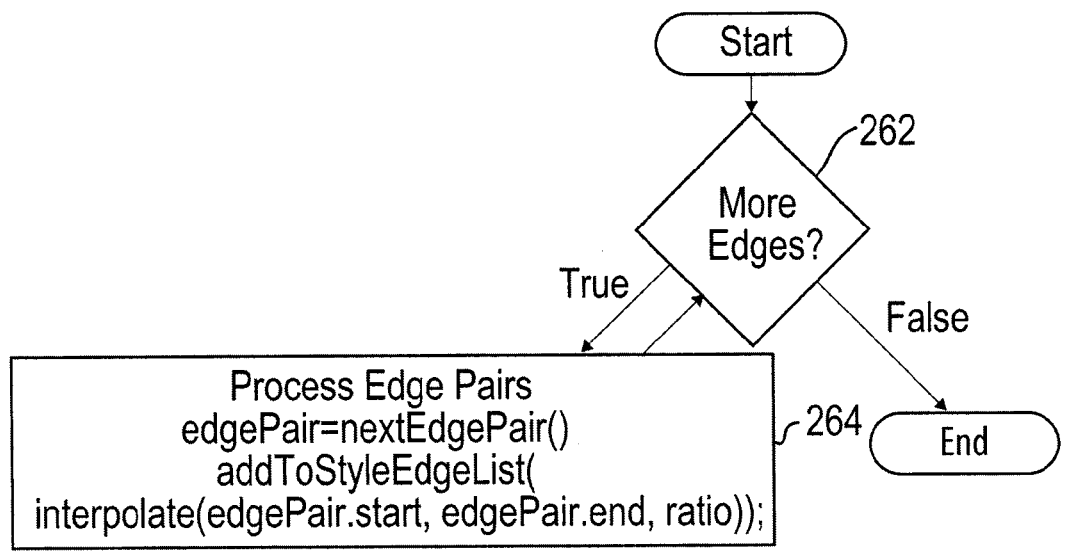
FIG. 20B is a flowchart illustrating and describing steps in a method for creating a shape data structure from the interpolated morph edge set for a particular morph ratio created in FIG. 20A.

FIG. 20B is a flowchart illustrating and describing steps in a method for creating a shape data structure from the interpolated morph edge set or list for a particular morph ratio created in FIG. 20A. This includes iterating over each morph edge consisting of start edges, end edges, and a morph style for a particular morph ratio. In step 262, a determination is made whether there are more records. If not, the process ends. If so, the method proceeds to step 264 in which the edge pairs are processed in turn. Each edge pair is added to a style edge list, and an interpolation is performed. As described earlier, in an embodiment, an intermediate undirected edge is created for each edge pair, by creating a linear combination of the edge pair, based on the given morph ratio. A path style graph representation can also be created corresponding to the morph path style and the given morph ratio. The path style graph representation can includes intermediate path style information and a graph formed from the intermediate undirected edges.

FIGS. 20A and 20B illustrate steps in generating a graph representation. The steps involved in creating a vector graphics path are performed between the methods shown in FIGS. 20A and 20B, and can be performed according to the steps shown in FIG. 4 and described earlier in relation thereto.

In an embodiment, the morphing implementation can be described as follows. A list of start and end edge pairs is created, since a valid morph must have the same number of edges in the start shape and end shape. For a particular morph ratio in a place object tag, iterate over the edge pairs, and create a linear combination of each edge pair using the morph ratio, and add the resulting edge to a shape data structure for each morph ratio.

The timeline of the morph will determine the intermediate number of frames between the start shape and the end shape. The number of frames determines the number of morph ratios, which in turn determines the number of paths to be created. In other words, the granularity is determined by the number of frames, which is specified in the SWF file.

In some embodiments, edges of the same path style are grouped and traversed together. In the case of morphing, the SWF file specifies start shape records and end shape records, and specifies the order that they are to be morphed between. This order can be preserved in embodiments described herein, rather than using the order previously specified with the algorithm.

The following describes in further detail an exemplary mobile electronic device that can include a processor, and a computer readable memory in communication with the processor. In an embodiment, the memory can store statements and instructions for execution by the processor to perform the method of converting a SWF shape definition into a vector graphics path definition as described and illustrated in the present application. In another embodiment, the memory can store statements and instructions for execution by the processor to perform the method of converting a SWF morph shape definition into a vector graphics path definition as described and illustrated in the present application. The mobile electronic device may be a two-way communication device with advanced data communication capabilities including the capability to communicate with other mobile electronic devices or computer systems through a network of transceiver stations. The mobile electronic device may also have the capability to allow voice communication. Depending on the functionality provided by the mobile electronic device, it may be referred to as a data messaging device, a two-way pager, a cellular telephone with data messaging capabilities, a wireless Internet appliance, or a data communication device (with or without telephony capabilities). The mobile electronic device may also be a mobile electronic device without wireless communication capabilities as a handheld electronic game device, digital photograph album, digital camera and the like.

Figure 21:
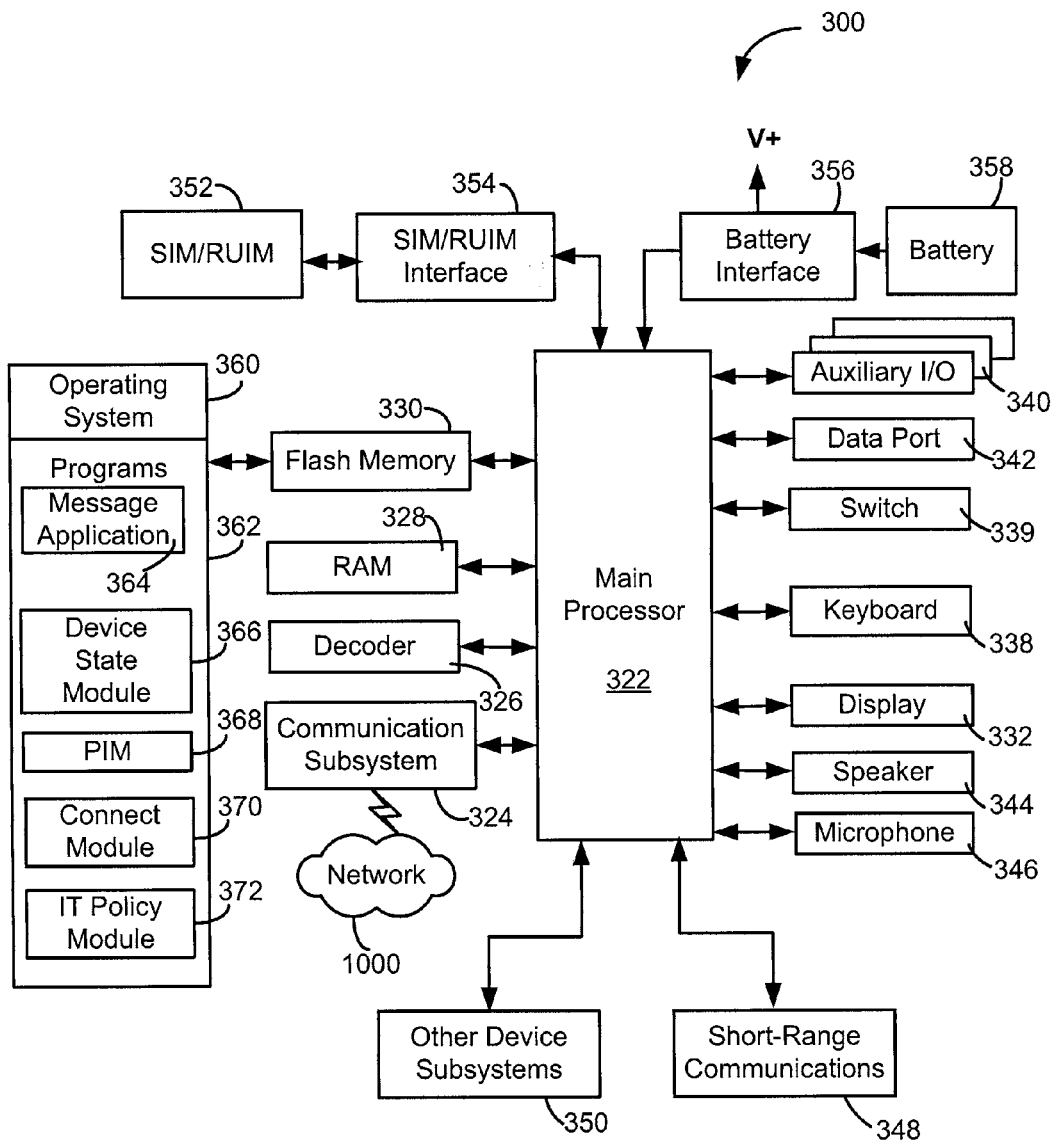
FIG. 21 is a block diagram of a mobile electronic device according to one example.

Referring FIG. 21, there is shown therein a block diagram of an exemplary embodiment of a mobile electronic device 300. The mobile electronic device 300 includes a number of components such as a processor 322 that controls the overall operation of the mobile electronic device 300. Communication functions, including data and voice communications, are performed through a communication subsystem 324. Data received by the mobile electronic device 300 can be decompressed and decrypted by a decoder 326, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 324 receives messages from and sends messages to a wireless network 1000. In this exemplary embodiment of the mobile electronic device 300, the communication subsystem 324 is configured in accordance with the Global System for Mobile Communication (GSM) and General Packet Radio Services (GPRS) standards. The GSM/GPRS wireless network is used worldwide. New standards such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 324 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the mobile electronic device 300 is a GSM/GPRS wireless network in one exemplary implementation, other wireless networks may also be associated with the mobile electronic device 300 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 322 also interacts with additional subsystems such as a Random Access Memory (RAM) 328, a flash memory 330, a display 332, a keyboard 338, a switch 339, an auxiliary input/output (I/O) subsystem 340, a data port 342, a speaker 344, a microphone 346, short-range communications 348, and other device subsystems 350. The flash memory 330 and RAM 328 are examples of a computer readable memory in communication with the processor. The memory can store statements and instructions for execution by the processor to perform the method of converting a SWF shape definition into a vector graphics path definition as described and illustrated in the present application. The memory can store statements and instructions for execution by the processor to perform the method of converting a SWF morph shape definition into a vector graphics path definition as described and illustrated in the present application.

Some of the subsystems of the mobile electronic device 300 perform communication-related functions, whereas other subsystems may provide "resident" or on-device functions. By way of example, the keyboard 338 may be used for both communication-related functions, such as entering a text message for transmission over the network 1000, and device-resident functions such as a calculator or task list.

The mobile electronic device 300 can send and receive communication signals over the wireless network 1000 after network registration or activation procedures have been completed. Network access is associated with a subscriber or user of the mobile electronic device 300. To identify a subscriber according to the present embodiment, the mobile electronic device 300 uses a SIM/RUIM card 352 (i.e. Subscriber Identity Module or a Removable User Identity Module) inserted into a SIM/RUIM interface 354 for communication with a network such as the network 1000. The SIM/RUIM card 352 is one type of a conventional "smart card" that can be used to identify a subscriber of the mobile electronic device 300 and to personalize the mobile electronic device 300, among other things. In the present embodiment the mobile electronic device 300 is not fully operational for communication with the wireless network 1000 without the SIM/RUIM card 352. By inserting the SIM/RUIM card 352 into the SIM/RUIM interface 354, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 352 includes a processor and memory for storing information. Once the SIM/RUIM card 352 is inserted into the SIM/RUIM interface 354, it is coupled to the processor 322. In order to identify the subscriber, the SIM/RUIM card 352 can include some user parameters such as an International Mobile Subscriber Identity (IMSI). An advantage of using the SIM/RUIM card 352 is that a subscriber is not necessarily bound by any single physical mobile electronic device. The SIM/RUIM card 352 may store additional subscriber information for a mobile electronic device as well, including datebook (or calendar) information and recent call information. Alternatively, user identification information can also be programmed into the flash memory 330. The mobile electronic device 300 can also be enabled to receive additional memory cards. For example, memory card slots (not shown) can be provided in the mobile electronic device 300 to receive such cards.

The mobile electronic device 300 is a battery-powered device and includes a battery interface 356 for receiving a battery pack containing one or more rechargeable battery cells 358, and associated control circuitry (not shown) that, in some embodiments, can interface with the battery interface 356. The battery pack has a form factor and contact arrangement suited to the particular mobile electronic device. In at least some embodiments, the battery 358 can be a smart battery with an embedded microprocessor. The battery interface 356 is coupled to a regulator (not shown), which assists the battery 358 in providing power V+ to the mobile electronic device 300. Although current technology makes use of a battery, future technologies such as micro fuel cells may provide the power to the mobile electronic device 300.

The mobile electronic device 300 also includes an operating system 360 and software components 362 which are described in more detail below. The operating system 360 and the software components 362 that are executed by the processor 322 are typically stored in a persistent store such as the flash memory 330, which may alternatively be a read-only memory (ROM) or similar storage element (not shown). Those skilled in the art will appreciate that portions of the operating system 360 and the software components 362, such as specific software applications 364, 366, 368, 370 and 372, or parts thereof, may be temporarily loaded into a volatile store such as the RAM 328. Other software components can also be included, as is well known to those skilled in the art.

The subset of software components 362 that control basic device operations, including data and voice communication applications, will normally be installed on the mobile electronic device 320 during its manufacture. Other software applications include a message application 364 that can be any suitable software program that allows a user of the mobile electronic device 300 to send and receive electronic messages. Various alternatives exist for the message application 364 as is well known to those skilled in the art. Messages that have been sent or received by the user are typically stored in the flash memory 330 of the mobile electronic device 300 or some other suitable storage element in the mobile electronic device 300. In at least some embodiments, some of the sent and received messages may be stored remotely from the device 300 such as in a data store of an associated host system that the mobile electronic device 300 communicates with.

The software components 362 can further include a device state module 366, a Personal Information Manager (PIM) 368, and other suitable modules (not shown). The device state module 366 provides persistence, i.e. the device state module 366 ensures that important device data is stored in persistent memory, such as the flash memory 330, so that the data is not lost when the mobile electronic device 300 is turned off or loses power.

The PIM 368 includes functionality for organizing and managing data items of interest to the user, such as, but not limited to, e-mail, contacts, calendar events, voice mails, appointments, and task items. The PIM 368 has the ability to send and receive data items via the wireless network 1000. PIM data items may be seamlessly integrated, synchronized, and updated via the wireless network 1000 with the mobile electronic device subscriber's corresponding data items stored or associated, or both, with a host computer system. This functionality creates a mirrored host computer on the mobile electronic device 330 with respect to such items. This can be particularly advantageous when the host computer system is the mobile electronic device subscriber's office computer system.

The software components 362 also include a connect module 370, and an information technology (IT) policy module 372. The connect module 370 implements the communication protocols that are required for the mobile electronic device 300 to communicate with the wireless infrastructure and any host system, such as an enterprise system, that the mobile electronic device 300 is authorized to interface with.

The connect module 370 includes a set of APIs that can be integrated with the mobile electronic device 300 to allow the mobile electronic device 300 to use any number of services associated with the enterprise system. The connect module 370 allows the mobile electronic device 300 to establish an end-to-end secure, authenticated communication pipe with the host system. A subset of applications for which access is provided by the connect module 370 can be used to pass IT policy commands from the host system to the mobile electronic device 300. This can be done in a wireless or wired manner. These instructions can then be passed to the IT policy module 372 to modify the configuration of the device 300. Alternatively, in some cases, the IT policy update can also be done over a wired connection.

Other types of software applications can also be installed on the mobile electronic device 300. These software applications can be third party applications, which are added after the manufacture of the mobile electronic device 300. Examples of third party applications include games, calculators, utilities, etc.

The additional applications can be loaded onto the mobile electronic device 300 through at least one of the wireless network 1000, the auxiliary I/O subsystem 340, the data port 342, the short-range communications subsystem 248, or any other suitable device subsystem 350. This flexibility in application installation increases the functionality of the mobile electronic device 300 and may provide enhanced on-device functions, communication-related functions, or both. For example, secure communication applications may enable electronic commerce functions and other such financial transactions to be performed using the mobile electronic device 300.

The data port 342 enables a subscriber to set preferences through an external device or software application and extends the capabilities of the mobile electronic device 300 by providing for information or software downloads to the mobile electronic device 300 other than through a wireless communication network. The alternate download path may, for example, be used to load an encryption key onto the mobile electronic device 300 through a direct and thus reliable and trusted connection to provide secure device communication.

The data port 342 can be any suitable port that enables data communication between the mobile electronic device 300 and another computing device. The data port 342 can be a serial or a parallel port. In some instances, the data port 342 can be a USB port that includes data lines for data transfer and a supply line that can provide a charging current to charge the battery 358 of the mobile electronic device 300.

The short-range communications subsystem 348 provides for communication between the mobile electronic device 300 and different systems or devices, without the use of the wireless network 1000. For example, the short-range communications subsystem 348 may include an infrared device and associated circuits and components for short-range communication. Examples of short-range communication standards include standards developed by the Infrared Data Association (IrDA), Bluetooth, and the 802.11 family of standards developed by IEEE.

Synchronization of files and data between the mobile electronic device 300 and another computing device can be achieved over the wireless network 1000, through the short-range communications system 348, or through a direct connection between the data port 342 of the mobile electronic device 300 and the other computing device. Synchronization causes the most recent version of files and data to be mirrored on either the mobile electronic device or the other computing device. As used herein, synchronization also refers to the downloading or uploading of pre-selected files from one device to the other. Synchronization of files and data can be initiated by the user of the device whenever a suitable connection between the mobile electronic device 300 and another computing device, such as a home computer, is detected, or can occur automatically when a connection is detected. A synchronization application, stored in the mobile electronic device 300 or the other computing device, or both, can determine the file and data types to be synchronized, the frequency of synchronization, and other parameters, appropriate to the particular synchronization algorithm implemented by the synchronization application.

In use, a received signal such as a text message, an e-mail message, or web page download is processed by the communication subsystem 324 and input to the processor 322. The processor 322 then processes the received signal for output to the display 332 or alternatively to the auxiliary I/O subsystem 340. A subscriber may also compose data items, such as e-mail messages, for example, using a touch-sensitive overlay (not shown) on the display 332 that is part of a touch screen display, and possibly the auxiliary I/O subsystem 340. The auxiliary I/O subsystem 340 may include devices such as: a mouse, track ball, infrared fingerprint detector, or a roller wheel with dynamic button pressing capability. A composed item may be transmitted over the wireless network 1000 through the communication subsystem 324.

For voice communications, the overall operation of the mobile electronic device 300 is substantially similar, except that the received signals are output to the speaker 344, and signals for transmission are generated by the microphone 346. Alternative voice or audio I/O subsystems, such as a voice message recording subsystem, can also be implemented on the mobile electronic device 300 Although voice or audio signal output is accomplished primarily through the speaker 344, the display 332 can also be used to provide additional information such as the identity of a calling party, duration of a voice call, or other voice call related information.

In the preceding description, for purposes of explanation, numerous details are set forth in order to provide a thorough understanding of the embodiments described herein. However, it will be apparent to one skilled in the art that these specific details are not required in order to practice the embodiments. In other instances, well-known electrical structures and circuits are shown in block diagram form in order not to obscure the embodiments. For example, specific details are not provided as to whether the embodiments described herein are implemented as a software routine, hardware circuit, firmware, or a combination thereof.

Embodiments described herein can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment described herein. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A processor-implemented method of converting a Shockwave Flash (SWF) shape definition, stored in a memory associated with the processor, including a first plurality of directed edges having a first path style in common, into a first vector graphics path definition corresponding to the first path style, the method comprising:
   i) creating, at the processor, a first path style graph representation corresponding to the first path style, based on mapping the first plurality of directed edges of the SWF shape definition having the first path style in common to a first plurality of vertices and undirected edges, and generating and storing connectivity information relating to the first plurality of vertices and undirected edges such that each of the undirected edges is connected to two of the first plurality of vertices and such that each of the first plurality of vertices is connected to two of the undirected edges, the first path style graph representation including first path style information and a first graph representation;
   ii) creating, at the processor, a first vector graphics path by traversing undirected edges of a graph represented by the first graph representation and by removing an undirected edge, after the undirected edge has been traversed, from each edge set to which the traversed edge belongs;
   iii) creating, at the processor, the first vector graphics path definition including the first vector graphics path and the first path style information; and
   iv) rendering the first vector graphics path definition.

2. The processor-implemented method of claim 1 wherein removing the undirected edge from the edge set after the edge has been traversed comprises:
   a) selecting an initial-vertex;
   b) traversing a selected edge in an initial-vertex edge set identifying those undirected edges connected to the initial-vertex, ending at a terminal-vertex; and
   c) removing the selected edge from the initial-vertex edge set and from a terminal-vertex edge set identifying those undirected edges connected to the terminal-vertex.

3. The processor-implemented method of claim 2 further comprising repeating steps a) through c) with the terminal-vertex from the previous step c) being selected as the initial-vertex in the current step a).

4. The processor-implemented method of claim 3 further comprising repeating steps a) through c) for a subsequent initial-vertex when a previously selected vertex has no remaining edges in its edge set.

5. The processor-implemented method of claim 1 wherein generating and storing connectivity information relating to the first plurality of vertices and undirected edges comprises:
   converting a directed-edge record of the SWF shape definition to a first vertex, a second vertex, and an undirected edge in the first path style graph representation, the undirected edge connecting the first and second vertices, and one of the first vertex and the second vertex being created based on a current position prior to conversion of the directed edge record;
   adding the undirected edge to a first edge set identifying those undirected edges connected to the first vertex; and
   adding the undirected edge to a second edge set identifying those undirected edges connected to the second vertex.

6. The processor-implemented method of claim 1 wherein each edge set for a respective vertex is implemented as a linked list of edges connected to that vertex.

7. The processor-implemented method of claim 1 further comprising: creating, for each vertex, a vertex hash based on co-ordinates of the vertex, and mapping each vertex to a set of all adjoining undirected edges in a vertex-specific edge set using the vertex hash.

8. The processor-implemented method of claim 1 wherein the path style comprises one of a line style and a fill style.

9. The processor-implemented method of claim 1 wherein creating the path style graph representation comprises omitting an undirected edge from the path style graph if a corresponding directed edge has a same fill style on both sides.

10. The processor-implemented method of claim 1 further comprising identifying the plurality of directed edges in the SWF shape definition having the path style in common.

11. The processor-implemented method of claim 1 wherein the path style information in the path style graph representation is in a different format than the path style information in the vector graphics path definition.

12. The processor-implemented method of claim 1 wherein the SWF shape definition includes a second plurality of directed edges having a second path style in common, and further comprising converting the SWF shape definition into a second vector graphics path definition corresponding to the second path style, the method comprising:
   iv) creating a second path style graph representation corresponding to the second path style, based on mapping the second plurality of directed edges of the SWF shape definition having the second path style in common to a second plurality of vertices and undirected edges, and generating and storing connectivity information relating to the second plurality of vertices and undirected edges, the second path style graph representation including second path style information and a second graph representation;
   v) creating a second vector graphics path by traversing undirected edges of a graph represented by the second graph representation and by removing an undirected edge, after the undirected edge has been traversed, from each edge set to which the traversed edge belongs; and vi) creating the second vector graphics path definition including the second vector graphics path and the second path style information.

13. The processor-implemented method of claim 12 further comprising: creating, for each path style, a path style hash based on an associated stored path style index, and mapping the path style index to the path style graph representation using the path style hash.

14. The processor-implemented method of claim 12 further comprising:
creating a shape data structure including a unique path style graph representation for each path style; and
creating a vector graphics shape definition including a unique vector graphics path definition for each path style.

15. A mobile device, comprising: a processor; and a computer readable memory in communication with the processor, the memory storing statements and instructions for execution by the processor to perform a method of converting a Shockwave Flash (SWF) shape definition, including a first plurality of directed edges having a first path style in common, into a first vector graphics path definition corresponding to the first path style, the method including:
i) creating a first path style graph representation corresponding to the first path style, based on mapping the first plurality of directed edges of the SWF shape definition having the first path style in common to a first plurality of vertices and undirected edges, and generating and storing connectivity information relating to the first plurality of vertices and undirected edges such that each of the undirected edges is connected to at least two of the first plurality of vertices and such that each of the first plurality of vertices is connected to two of the undirected edges, the first path style graph representation including first path style information and a first graph representation;
ii) creating a first vector graphics path by traversing undirected edges of a graph represented by the first graph representation and by removing an undirected edge, after the undirected edge has been traversed, from each edge set to which the traversed edge belongs; and
iii) creating the first vector graphics path definition including the first vector graphics path and the first path style information.

16. The mobile device of claim 15 wherein removing the undirected edge from the edge set after the edge has been traversed comprises:
a) selecting an initial-vertex;
b) traversing a selected edge in an initial-vertex edge set identifying those undirected edges connected to the initial-vertex, ending at a terminal-vertex; and
c) removing the selected edge from the initial-vertex edge set and from a terminal-vertex edge set identifying those undirected edges connected to the terminal-vertex.

17. The mobile device of claim 16 further comprising repeating steps a) through c) with the terminal-vertex from the previous step c) being selected as the initial-vertex in the current step a).

18. The mobile device of claim 17 further comprising repeating steps a) through c) for a subsequent initial-vertex when a previously selected vertex has no remaining edges in its edge set.

19. The mobile device of claim 15 wherein generating and storing connectivity information relating to the first plurality of vertices and undirected edges comprises:
converting a directed-edge record of the SWF shape definition to a first vertex, a second vertex, and an undirected edge in the first path style graph representation, the undirected edge connecting the first and second vertices, and one of the first vertex and the second vertex being created based on a current position prior to conversion of the directed edge record;
adding the undirected edge to a first edge set identifying those undirected edges connected to the first vertex; and
adding the undirected edge to a second edge set identifying those undirected edges connected to the second vertex.

20. The mobile device of claim 15 wherein each edge set for a respective vertex is implemented as a linked list of edges connected to that vertex.

21. The mobile device of claim 15 further comprising: creating, for each vertex, a vertex hash based on co-ordinates of the vertex, and mapping each vertex to a set of all adjoining undirected edges in a vertex-specific edge set using the vertex hash.

22. The mobile device of claim 15 wherein the path style comprises one of a line style and a fill style.

23. The mobile device of claim 15 wherein the SWF shape definition includes a second plurality of directed edges having a second path style in common, and further comprising converting the SWF shape definition into a second vector graphics path definition corresponding to the second path style, the method comprising:
iv) creating a second path style graph representation corresponding to the second path style, based on mapping the second plurality of directed edges of the SWF shape definition having the second path style in common to a second plurality of vertices and undirected edges, and generating and storing connectivity information relating to the second plurality of vertices and undirected edges, the second path style graph representation including second path style information and a second graph representation;
v) creating a second vector graphics path by traversing undirected edges of a graph represented by the second graph representation and by removing an undirected edge, after the undirected edge has been traversed, from each edge set to which the traversed edge belongs; and
vi) creating the second vector graphics path definition including the second vector graphics path and the second path style information.

24. The mobile device of claim 23 further comprising: creating, for each path style, a path style hash based on an associated stored path style index, and mapping the path style index to the path style graph representation using the path style hash.

25. A non-transitory computer readable memory storing statements and instructions for execution by a processor to perform a method of converting a Shockwave Flash (SWF) shape definition, including a plurality of directed edges having a path style in common, into a vector graphics path definition corresponding to the path style, the method including:
i) creating a path style graph representation corresponding to the path style, based on mapping the plurality of directed edges of the SWF shape definition having the path style in common to a plurality of vertices and undirected edges, and generating and storing connectivity information relating to the plurality of vertices and undirected edges such that each of the undirected edges is connected to two of the plurality of vertices and such that each of the first plurality of vertices is connected to two of the undirected edges, the path style graph representation including path style information and a graph representation;

ii) creating a vector graphics path by traversing undirected edges of a graph represented by the graph representation and by removing an undirected edge, after the undirected edge has been traversed, from each edge set to which the traversed edge belongs; and iii) creating the vector graphics path definition including the vector graphics path and the path style information.

* * * * *